United States Patent
Chen et al.

(10) Patent No.: US 12,205,312 B2
(45) Date of Patent: Jan. 21, 2025

(54) METHOD AND DEVICE FOR OBTAINING DEPTH INFORMATION FROM INFRARED LIGHT PATTERN PROJECTION

(71) Applicant: Honor Device Co., Ltd., Shenzhen (CN)

(72) Inventors: Guoqiao Chen, Shenzhen (CN);
Mengyou Yuan, Shenzhen (CN);
Jiangfeng Yuan, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 632 days.

(21) Appl. No.: 17/290,660

(22) PCT Filed: Oct. 21, 2019

(86) PCT No.: PCT/CN2019/112254
§ 371 (c)(1),
(2) Date: Apr. 30, 2021

(87) PCT Pub. No.: WO2020/088290
PCT Pub. Date: May 7, 2020

(65) Prior Publication Data
US 2022/0020165 A1      Jan. 20, 2022

(30) Foreign Application Priority Data

Oct. 30, 2018   (CN) .......................... 201811279855.7

(51) Int. Cl.
*G06K 9/00* (2022.01)
*G06T 7/514* (2017.01)
*G06T 7/593* (2017.01)

(52) U.S. Cl.
CPC .............. *G06T 7/593* (2017.01); *G06T 7/514* (2017.01); *G06T 2207/10012* (2013.01); *G06T 2207/10048* (2013.01)

(58) Field of Classification Search
CPC ................................. G06T 7/521; G06T 7/514
See application file for complete search history.

(56) References Cited

U.S. PATENT DOCUMENTS

| 9,638,511 B2 | 5/2017 | Boppart et al. | |
| 2011/0025827 A1* | 2/2011 | Shpunt | H04N 5/33 |
| | | | 348/46 |

(Continued)

FOREIGN PATENT DOCUMENTS

| CN | 102789114 A | 11/2012 |
| CN | 203055077 U | 7/2013 |

(Continued)

OTHER PUBLICATIONS

Zhou, Xing. "A study of microsoft kinect calibration." Dept. of Computer Science, George Mason University, Fairfax (2012). (Year: 2012).*

(Continued)

*Primary Examiner* — Gregory A Morse
*Assistant Examiner* — Owais Iqbal Memon
(74) *Attorney, Agent, or Firm* — Conley Rose, P.C.

(57) ABSTRACT

Embodiments of this application provide a method for obtaining depth information and an electronic device, which is applied to the field of image processing technologies and can help an electronic device improve accuracy of obtaining depth information. The electronic device includes a first camera, a second camera, and an infrared projector. The electronic device receives a instruction to obtain depth information of a target object; transmits infrared light with a light spot by an infrared projector; collects first image information of the target object by using the first camera; collects second image information by using the second camera, where the first and second image information include a feature of the target object and a texture feature formed by infrared light; and calculates depth information of (Continued)

the target object based on the first and second image information, the first length, lens focal lengths of the first camera and the second camera.

26 Claims, 23 Drawing Sheets

(56) References Cited

U.S. PATENT DOCUMENTS

| | | | | |
|---|---|---|---|---|
| 2016/0040978 | A1* | 2/2016 | Boppart | G01B 9/02091 |
| | | | | 356/479 |
| 2016/0377414 | A1* | 12/2016 | Thuries | G02B 27/1093 |
| | | | | 359/558 |
| 2019/0339366 | A1* | 11/2019 | Saito | G01S 7/4863 |
| 2021/0304428 | A1* | 9/2021 | Cao | H04N 23/611 |
| 2021/0406350 | A1 | 12/2021 | Chen et al. | |
| 2022/0020165 | A1 | 1/2022 | Chen et al. | |

FOREIGN PATENT DOCUMENTS

| | | | | | |
|---|---|---|---|---|---|
| CN | 104634276 | A | | 5/2015 | |
| CN | 104918035 | A | | 9/2015 | |
| CN | 204613977 | U | | 9/2015 | |
| CN | 105049829 | A | | 11/2015 | |
| CN | 106292144 | A | | 1/2017 | |
| CN | 206541078 | U | | 10/2017 | |
| CN | 206559462 | U | | 10/2017 | |
| CN | 107369156 | A | | 11/2017 | |
| CN | 108052878 | | | 5/2018 | |
| CN | 108052878 | A | | 5/2018 | |
| CN | 108107662 | A | | 6/2018 | |
| CN | 108107662 | Y | | 6/2018 | |
| CN | 108195305 | | | 6/2018 | |
| CN | 108195305 | A | * | 6/2018 | ............ G01B 11/22 |
| CN | 108234984 | A | | 6/2018 | |
| CN | 207530934 | U | | 6/2018 | |
| CN | 108271012 | A | | 7/2018 | |
| CN | 108388071 | A | * | 8/2018 | ......... G02B 27/4205 |
| CN | 108388071 | Y | | 8/2018 | |
| CN | 108701232 | A | | 10/2018 | |
| CN | 109544618 | | | 3/2019 | |
| CN | 109544618 | A | | 3/2019 | |
| CN | 109635539 | | | 4/2019 | |
| CN | 109635539 | A | | 4/2019 | |
| JP | 2001264033 | A | | 9/2001 | |
| WO | 2018131514 | A1 | | 7/2018 | |

OTHER PUBLICATIONS

Cicala, Roger. "All about lens coatings" https://www.canonrumors.com/tech-articles/all-about-lens-coatings/ . (Year: 2011).*

Warzak, B., "Dual-band filters target price-sensitive applications," Vision Systems Design, Nov. 15, 2016, 22 pages.

* cited by examiner (a)

(b)

METHOD AND DEVICE FOR OBTAINING DEPTH INFORMATION FROM INFRARED LIGHT PATTERN PROJECTION

CROSS-REFERENCE TO RELATED APPLICATIONS

This application is a national stage of international patent application no. PCT/CN2019/112254, filed on Oct. 21, 2019, which claims priority to Chinese Patent Application No. 201811279855.7 filed on Oct. 30, 2018. Both of the aforementioned applications are hereby incorporated by reference in their entireties.

TECHNICAL FIELD

Embodiments of this application relate to the field of image processing technologies, and in particular, to a method for obtaining depth information and an electronic device.

BACKGROUND

With development of electronic technologies, functions of an electronic device become increasingly diversified. For example, the electronic device may include functions such as facial recognition and augmented reality (augmented reality, AR). Using the facial recognition as an example, when performing facial recognition, the electronic device may not only collect a two-dimensional image of a target object (for example, a human face), but also obtain depth information of the target object.

Specifically, the electronic device may collect image information of the target object separately by using a binocular camera (that is, two cameras, for example, a camera 1 and a camera 2); then identify a same feature in image information collected by the camera 1 and image information collected by the camera 2, and calculate a parallax between the camera 1 and the camera 2 for the same feature; and then calculate a depth of the point of the feature (that is, a vertical distance from the point to a connection line between the two cameras) based on the parallax and hardware parameters of the camera 1 and the camera 2. Depths of a plurality of points of the target object may constitute the depth information of the target object. The depth information of the target object may represent a three-dimensional feature of the target object.

It can be learned that a larger quantity of features in the image information collected by the camera 1 and the camera 2 indicates a larger quantity of same features identified by the electronic device 100 in the image information collected by the camera 1 and the image information collected by the camera 2. A larger quantity of same features identified by the electronic device indicates that the electronic device can calculate depths of more points and the depth information of the target object is more accurate.

A quantity of features included in the image information collected by the camera is affected by at least the following two parameters: (1) Whether the target object has an obvious feature. For example, if the target object has distinct edges and corners (that is, the target object has a comparatively obvious feature), the image information of the target object that is collected by the camera may include a comparatively large quantity of features; or if the target object is comparatively smooth, that is, the target object (for example, a white wall) does not have an obvious feature, the image information of the target object that is collected by the camera includes a comparatively small quantity of features. (2) Light intensity. For example, when light is comparatively strong, the image information collected by the camera includes a comparatively large quantity of features; or when light is comparatively poor, the image information collected by the camera includes a comparatively small quantity of features.

To sum up, a larger quantity of features in the image information collected by the binocular camera indicates higher accuracy of the depth information of the target object that is calculated by the electronic device. However, a quantity of features in the image information collected by the binocular camera is affected by a plurality of factors. In other words, accuracy of the depth information is affected by a plurality of factors. Therefore, it is very difficult for the electronic device to obtain comparatively accurate depth information.

SUMMARY

Embodiments of this application provide a method for obtaining depth information and an electronic device, to improve accuracy of depth information of a target object that is obtained by an electronic device.

According to a first aspect, an embodiment of this application provides a method for obtaining depth information. The method may be applied to an electronic device. The electronic device includes an infrared projector, a first camera, and a second camera. A distance between the first camera and the second camera is a first length. The method may include: The electronic device receives a first instruction used to trigger the electronic device to obtain depth information of a target object; in response to the first instruction, emits infrared light with a light spot by using the infrared projector, collects first image information of the target object by using the first camera, and collects second image information of the target object by using the second camera; and calculates the depth information of the target object based on the first image information, the second image information, the first length, a lens focal length of the first camera, and a lens focal length of the second camera.

A larger quantity of features and a more obvious feature in the image information collected by the first camera and the image information collected by the second camera indicate a larger quantity of same features identified by the electronic device in the first image information and the second image information. A larger quantity of same features identified by the electronic device indicates that the electronic device can calculate depths of more points at which features are located. Because the depth information of the target object includes depths of a plurality of points of the target object, a larger quantity of point depths calculated by the electronic device indicates higher accuracy of the depth information of the target object.

In this embodiment, the first image information and the second image information include a feature of the target object and a texture feature formed when the infrared light with the light spot is irradiated onto the target object. In other words, the first image information and the second image information not only include the feature of the target object, but also include the texture feature formed when the infrared light with the light spot is irradiated onto the target object.

After a quantity of features in images of the target object that are collected by the first camera and the second camera is increased, the electronic device can more accurately identify a same feature in the image information collected by the first camera and the image information collected by the second camera, and further determine a parallax between the first camera and the second camera for the same feature and calculate a depth of each point, to obtain the depth information of the target object. This can improve accuracy of the depth information of the target object that is calculated by the electronic device.

With reference to the first aspect, in a possible design manner, the lens focal length of the first camera is the same as that of the second camera.

With reference to the first aspect, in another possible design manner, a method for calculating, by the electronic device, the depth information of the target object based on the first image information, the second image information, the first length, the lens focal length of the first camera, and the lens focal length of the second camera may include: The electronic device calculates parallaxes between the first camera and the second camera for a plurality of first features in the first image information and the second image information, where the first features are same features in the first image information and the second image information. For each first feature, the electronic device calculates a depth Z of a point at which the first feature is located by using the following formula (2) and based on a parallax between the first camera and the second camera for the first feature, the first length, and the lens focal length, to obtain the depth information of the target object:

$$Z = \frac{f \times T}{d} \quad \text{Formula (2)}$$

where f is the lens focal length, d is the parallax between the first camera and the second camera for the first feature, and T is the first length.

It can be understood that distances between features of the target object (for example, a nasal tip and an eye of a person) and the camera may be different. A distance between each feature of the target object and the camera is referred to as a depth of the feature (or a point at which the feature is located). Depths of points of the target object constitute the depth information of the target object. The depth information of the target object may represent a three-dimensional feature of the target object.

With reference to the first aspect, in another possible design manner, the plurality of first features are some of same features in the first image information and the second image information. The electronic device 100 may select a plurality of first features from the first image information based on preset feature frequency, then search the second image information for a feature that is the same as the plurality of first features, and finally calculate a depth of each first feature, to obtain the depth information of the target object. Alternatively, the electronic device may select some first features from the first image information randomly or at an interval.

The feature frequency may be a quantity of same first features that appear in a preset area. The feature frequency, reflected on an image, may be a distance (referred to as a feature distance) between two adjacent first features selected by the electronic device. A method for selecting, by the electronic device, the plurality of first features from the first image information based on the preset feature frequency may include: The electronic device selects one first feature from all features in the first image information at an interval of one feature distance. In other words, the electronic device does not need to calculate a depth of a point at which each of same features in the first image information and the second image information is located, but selects one feature at an interval of one feature distance, and calculates a depth of a point at which the selected feature is located.

With reference to the first aspect, in another possible design manner, the infrared light with the light spot includes a plurality of light spots, and the plurality of light spots include a plurality of speckle lattice groups. One speckle lattice group includes one or more speckle lattices, and each speckle lattice includes a plurality of speckles.

With reference to the first aspect, in another possible design manner, at least two of the plurality of speckle lattice groups are different. At least two of the plurality of speckle lattice groups are different, so that repetition of speckle lattice groups in the plurality of light spots can be reduced, thereby helping the electronic device identify different features.

With reference to the first aspect, in another possible design manner, the first speckle lattice group is any one of the plurality of speckle lattice groups, and at least two of a plurality of speckle lattices included in the first speckle lattice group are different. At least two of the plurality of speckle lattices are different, so that repetition of speckle lattices in the plurality of light spots can be reduced, thereby helping the electronic device identify different features.

With reference to the first aspect, in another possible design manner, the first speckle lattice is any one of the plurality of speckle lattices. Each of a plurality of speckles in the first speckle lattice has a same shape. If all of the plurality of speckles have the same shape, the electronic device may identify different speckles based on locations of the speckles in the speckle lattice.

At least two of a plurality of speckles in the first speckle lattice have different shapes. At least two of the plurality of speckles have different shapes, so that repetition of a plurality of speckles in the speckle lattice can be reduced, thereby helping the electronic device identify different features.

With reference to the first aspect, in another possible design manner, the electronic device selects a plurality of first features from the first image information and the second image information based on preset feature frequency. The feature frequency is greater than or equal to repetition frequency of speckle lattices in the plurality of light spots. The feature frequency is represented by a quantity of same first features selected by the electronic device from an image with a preset area, and the repetition frequency is represented by a quantity of same speckle lattices that appear in the preset area.

The feature distance used when the electronic device selects the first feature may be less than or equal to a repetition interval of the speckle lattices in the plurality of light spots. In other words, the feature frequency is greater than or equal to the repetition frequency of the speckle lattices in the plurality of light spots. In this way, it can be ensured as far as possible that two adjacent first features selected by the electronic device from the first image information correspond to speckles in different speckle lattices, so that the electronic device can distinguish between the two adjacent first features. This can reduce a possibility of a feature matching error, and improve accuracy of the depth information calculated by the electronic device.

With reference to the first aspect, in another possible design manner, two sides of each lens of the first camera and the second camera each include an antireflection coating, and light filters of the first camera and the second camera each include a cut-off coating. The antireflection coating is used to increase a transmittance of infrared light. The cut-off coating is used to filter out light other than infrared light and visible light, and increase a transmittance of infrared light.

A common red-green-blue (red green blue, RGB) camera can sense only visible light, but cannot sense infrared light. To reduce hardware costs of the electronic device, an antireflection coating may be plated on each of two sides of each lens of the RGB camera, and a cut-off coating may be plated on (one side or each of two sides of) a light filter of the RGB camera, to obtain a dual-pass camera (that is, the first camera and the second camera) in which each of two sides of each lens includes an antireflection coating and a light filter includes a cut-off coating.

With reference to the first aspect, in another possible design manner, the infrared light is infrared light of 890 nanometers (nm) to 990 nm. For example, the infrared light may be specifically infrared light of 940 nm. Correspondingly, the antireflection coating may be an antireflection coating for infrared light of 890 nm to 990 nm, for example, an antireflection coating for infrared light of 940 nm.

With reference to the first aspect, in another possible design manner, the first length ranges from 20 millimeters to 30 millimeters.

With reference to the first aspect, in another possible design manner, the electronic device further includes a third camera, and the third camera is an RGB camera. The third camera is configured to collect image information under visible light. The image information collected by the third camera is used to be displayed on a display screen of the electronic device.

According to a second aspect, an embodiment of this application provides an electronic device. The electronic device includes one or more processors, a memory, an infrared projector, a first camera, and a second camera. A distance between the first camera and the second camera is a first length. The memory, the infrared projector, the first camera, and the second camera are coupled to the processor. The memory is configured to store information. The processor is configured to receive a first instruction, where the first instruction is used to trigger the electronic device to obtain depth information of a target object. The processor is further configured to: in response to the first instruction, emit infrared light with a light spot by using the infrared projector, collect first image information of the target object by using the first camera, and collect second image information of the target object by using the second camera, where the first image information and the second image information include a feature of the target object and a texture feature formed when the infrared light with the light spot is irradiated onto the target object. The processor is further configured to calculate the depth information of the target object based on the first image information collected by the first camera, the second image information collected by the second camera, the first length, a lens focal length of the first camera, and a lens focal length of the second camera.

With reference to the second aspect, in a possible design manner, the lens focal length of the first camera is the same as that of the second camera.

With reference to the second aspect, in another possible design manner, that the processor is configured to calculate the depth information of the target object based on the first image information, the second image information, the first length, a lens focal length of the first camera, and a lens focal length of the second camera includes: The processor is configured to calculate parallaxes between the first camera and the second camera for a plurality of first features in the first image information and the second image information, where the first features are same features in the first image information and the second image information; and for each first feature, calculate a depth Z of a point at which the first feature is located by using the foregoing formula (2) and based on a parallax between the first camera and the second camera for the first feature, the first length, and the lens focal length, to obtain the depth information of the target object, where f is the lens focal length, d is the parallax between the first camera and the second camera for the first feature, and T is the first length.

With reference to the second aspect, in a possible design manner, the processor is further configured to select a plurality of first features from the first image information and the second image information before calculating the parallaxes between the first camera and the second camera for the plurality of first features in the first image information and the second image information. The plurality of first features are some of same features in the first image information and the second image information.

With reference to the second aspect, in a possible design manner, the infrared light with the light spot includes a plurality of light spots, and the plurality of light spots include a plurality of speckle lattice groups. One speckle lattice group includes one or more speckle lattices, and each speckle lattice includes a plurality of speckles.

It should be noted that, in the second aspect and the possible design manners of the second aspect, for the speckle lattice group, the speckle lattice, the plurality of speckles in the speckle lattice, and a wavelength of the infrared light emitted by the infrared projector, reference may be made to related descriptions in the possible design manners of the first aspect. Details are not described herein again.

With reference to the second aspect, in a possible design manner, the processor is configured to select a plurality of first features from the first image information and the second image information based on preset feature frequency. The feature frequency is greater than or equal to repetition frequency of speckle lattices in the plurality of light spots. The feature frequency is represented by a quantity of same first features selected by the processor from an image with a preset area, and the repetition frequency is represented by a quantity of same speckle lattices that appear in a preset area.

With reference to the second aspect, in a possible design manner, two sides of each lens of the first camera and the second camera each include an antireflection coating, and light filters of the first camera and the second camera each include a cut-off coating. The antireflection coating is used to increase a transmittance of infrared light. The cut-off coating is used to filter out light other than infrared light and visible light, and increase a transmittance of infrared light.

With reference to the second aspect, in a possible design manner, the electronic device further includes a third camera and a display screen. The third camera is an RGB camera. The third camera is configured to collect image information under visible light. The image information collected by the third camera is used to be displayed on the display screen.

According to a third aspect, an embodiment of this application provides a dual-pass camera (that is, the first camera or the second camera). The dual-pass camera is configured to receive visible light and infrared light. Two sides of each lens of the dual-pass camera each include an antireflection coating, and a light filter of the dual-pass camera includes a cut-off coating. The antireflection coating is used to increase a transmittance of infrared light. The cut-off coating is used to filter out light other than infrared light and visible light, and increase a transmittance of infrared light.

With reference to the third aspect, in a possible design manner, the dual-pass camera includes: an RGB camera, an antireflection coating plated on each of two sides of each lens of the RGB camera, and a cut-off coating plated on (one side or each of two sides of) a light filter of the RGB camera.

According to a fourth aspect, an embodiment of this application provides a computer storage medium, including a computer instruction. When the computer instruction runs on an electronic device, the electronic device is enabled to perform the method for obtaining depth information in the first aspect and the possible design manners of the first aspect.

According to a fifth aspect, an embodiment of this application provides a computer program product. When the computer program product runs on a computer, the computer is enabled to perform the method for obtaining depth information in the first aspect and the possible design manners of the first aspect.

It can be understood that the electronic device in the second aspect and the possible design methods of the second aspect, the computer storage medium in the third aspect, and the computer program product in the fourth aspect are all configured to perform the corresponding methods provided in the foregoing descriptions. Therefore, for beneficial effects that can be achieved by the electronic device, the computer storage medium, and the computer program product, refer to the beneficial effects of the corresponding methods provided in the foregoing descriptions. Details are not described herein again.

DESCRIPTION OF EMBODIMENTS

Embodiments of this application provide a method for obtaining depth information. The method may be applied to a process in which an electronic device obtains image information of a target object. The image information may include a two-dimensional image of the target object and depth information of the target object.

Generally, the target object (for example, a human face) is an object in a three-dimensional form. When a camera of the electronic device photographs the target object, distances between features of the target object (for example, a nasal tip and an eye of a person) and the camera may be different. A distance between each feature of the target object and the camera is referred to as a depth of the feature (or a point at which the feature is located). Depths of points of the target object constitute the depth information of the target object. The depth information of the target object may represent a three-dimensional feature of the target object.

For a binocular camera (that is, two cameras, for example, a first camera and a second camera), the distance between each feature of the target object and the camera (that is, the depth of the point) may be a vertical distance from the point at which each feature of the target object is located to a connection line between the two cameras. For example, as shown in FIG. 1B, it is assumed that P is a feature of the target object, and a depth of the feature P is a vertical distance Z from P to $O^L O^R$. $O^L$ is a location of the first camera, and $O^R$ is a location of the second camera.

An electronic device provided in the embodiments of this application may include an infrared projector and two dual-pass cameras (for example, a first camera and a second camera). A distance between the two dual-pass cameras is a first length. Generally, a distance between centers of two cameras is referred to as a distance between the two cameras.

Figure 1A:
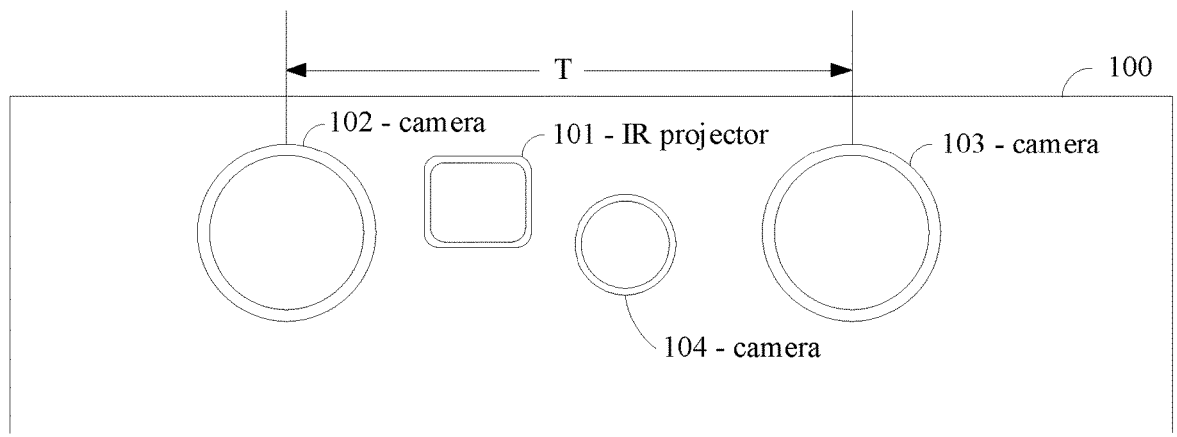
FIG. 1A is a partial schematic diagram of an electronic device according to an embodiment of this application.
Figure 1B:
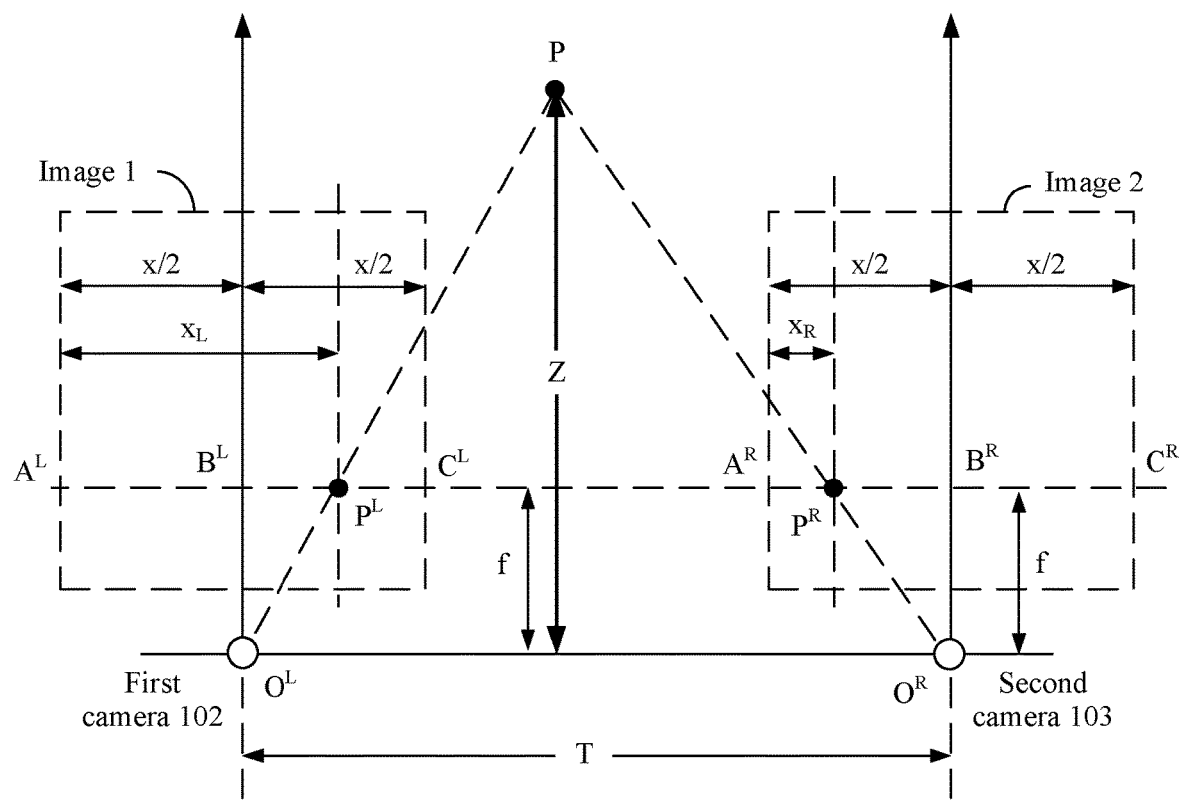
FIG. 1B is a schematic diagram 1 of a principle of calculating depth information according to an embodiment of this application.

FIG. 1A is a partial schematic diagram of an electronic device 100 according to an embodiment of this application. As shown in FIG. 1A, the electronic device 100 may include an infrared projector 101, a first camera 102, and a second camera 103. A distance between the first camera 102 and the second camera 103 is a first length T.

The infrared projector 101 is configured to emit infrared light with a light spot. A dual-pass camera means that the camera not only can receive visible light, but also can receive infrared light. For example, the dual-pass camera may receive visible light and infrared light of 940 nm. 940 nm is a wavelength of the infrared light. Certainly, the foregoing two dual-pass cameras may be replaced with two all-pass cameras. An all-pass camera means that the camera can receive a plurality of types of light including visible light, infrared light, and light of another wavelength. In contrast, a normal RGB camera can receive visible light, but cannot receive infrared light.

In this embodiment of this application, the first camera 102 may be a left-side dual-pass camera, and the second camera 103 may be a right-side dual-pass camera; or the first camera 102 may be a right-side dual-pass camera, and the second camera 103 may be a left-side dual-pass camera. In FIG. 1A, a partial structure of the electronic device 100 is described by using an example in which the first camera 102 is a left-side dual-pass camera and the second camera 103 is a right-side dual-pass camera.

It should be noted that, in this embodiment of this application, the first camera 102 and the second camera 103 may receive infrared light of a same type. The infrared light of the same type is infrared light of a same wavelength. In other words, the first camera 102 and the second camera 103 have a same capability of receiving infrared light. For example, the first camera 102 and the second camera 103 may receive infrared light of 940 nm. In addition, in this embodiment of this application, the infrared light emitted by the infrared projector 101 and infrared light that can be received by the first camera 102 and the second camera 103 are also infrared light of a same type.

The electronic device 100 may calculate a depth of each feature of a target object based on a parallax of the binocular camera for a same feature, with reference to a hardware parameter of the binocular camera, and by using a triangulation principle, to obtain depth information of the target object.

In this embodiment of this application, a method for calculating the depth information by the electronic device 100 based on the parallax is described herein by using an example.

As shown in FIG. 1B, $O^L$ is a location of the first camera 102, $O^R$ is a location of the second camera 103, and a distance between $O^L$ and $O^R$ is the first length T, in other words, $O^L O^R = T$. A lens focal length of the first camera 102 and a lens focal length of the second camera 103 are both f.

A feature P is a feature of the target object. A vertical distance from a point at which the feature P is located to a connection line between the first camera 102 and the second camera 103 is Z. In other words, depth information of P is Z. The first camera 102 collects an image 1 of the target object, and the feature P is at a point $P^L$ in the image 1. The second camera 103 collects an image 2 of the target object, and the feature P is at a point $P^R$ in the image 2. A feature corresponding to the point $P^L$ in the image 1 and a feature corresponding to the point $P^R$ in the image 2 are both the feature P of the target object.

As shown in FIG. 1B, $A^L C^L = A^R C^R = x$, and $A^L B^L = B^L C^L = A^R B^R = B^R C^R = x/2$. A distance between the feature $P^L$ and a feature $A^L$ is $x_L$, that is, a distance between the feature $P^L$ and a leftmost end of the image 1 is $x_L$, in other words, $A^L P^L = x_L$. A distance between the feature $P^R$ and a feature $A^R$ is $x_R$, that is, a distance between the feature $P^R$ and a leftmost end of the image 2 is $x_R$, in other words, $A^R P^R = x_R$. A difference between $A^L P^L$ and $A^R P^R$ is a parallax between the first camera 102 and the second camera 103 for the feature P, in other words, the parallax d of the feature P is equal to $x_L - x_R$.

Because $P^L P^R$ is parallel to $O^L O^R$, the following formula (1) may be obtained according to a triangle principle:

$$\frac{P^L P^R}{O_L O_R} = \frac{Z-f}{Z} \qquad \text{Formula (1)}$$

where $P^L P^R = O^L O^R [[O_L O_R]] - B^L P^L - P^R B^R$, $O^L O^R = T$, $B^L P^L = A^L P^L - A^L B^L = x_L - x/2$, $P^R B^R = x/2 - X_R$, and $P^L P^R = T - (x_L - x/2) - (x/2 - x_R) = T - (x_L - x_R) = T - d$.

The following formulas may be obtained by substituting $P^L P^R = T - d$ and $O^L O^R = T$ into the formula (1):

$$\frac{T-(x_L-x_R)}{T} = \frac{T-d}{T} = \frac{Z-f}{Z}$$

$$Z = \frac{f \times T}{d}$$

It can be learned from $$Z = \frac{f \times T}{d}$$

that the depth Z of the feature P may be calculated by using the distance T between the two cameras, the lens focal length f of the two cameras, and the parallax d.

It can be learned from the foregoing descriptions that a larger quantity of features and a more obvious feature in image information collected by the first camera 102 (that is, first image information, for example, the image 1) and image information collected by the second camera 103 (that is, second image information, for example, the image 2) indicate a larger quantity of same features identified by the electronic device 100 in the first image information and the second image information. A larger quantity of same features identified by the electronic device 100 indicates that the electronic device 100 can calculate depths of more points at which features are located. Because the depth information of the target object includes depths of a plurality of points of the target object, a larger quantity of point depths calculated by the electronic device 100 indicates higher accuracy of the depth information of the target object.

Figure 1C:
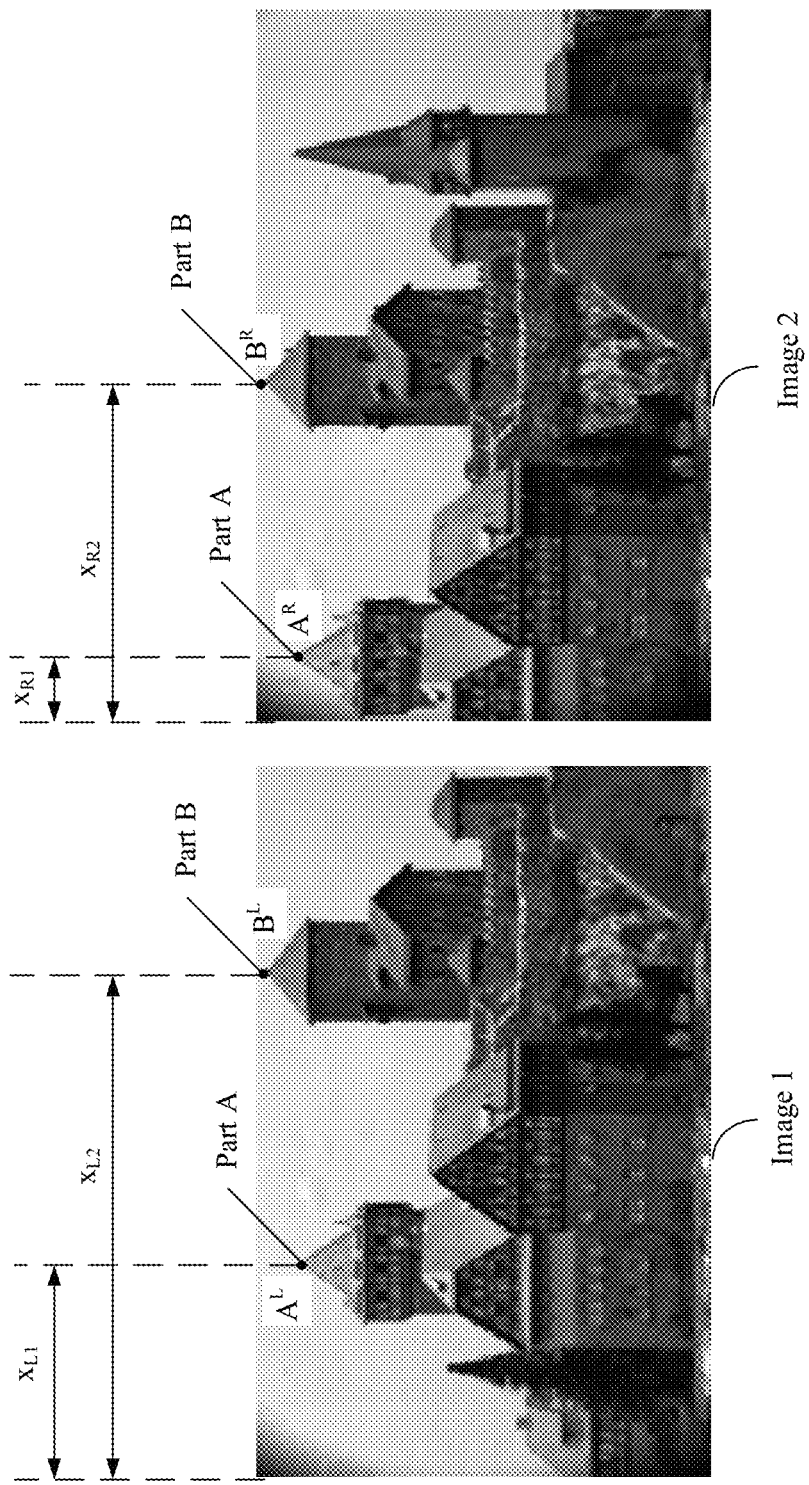
FIG. 1C is a schematic diagram of an example of a same feature in two pieces of image information collected by a binocular camera according to an embodiment of this application.

A same feature in the two pieces of image information is information corresponding to a same feature in the two pieces of image information. For example, if a point $A^L$ in the first image information corresponds to a part A of the object and a point $A^R$ in the second image information also corresponds to the part A of the object, the point $A^L$ and the point $A^R$ are same features in the two pieces of image information. For example, the first image information includes an image 1 of a building shown in FIG. 1C, and the second image information includes an image 2 of the building shown in FIG. 1C. A point $A^L$ in the image 1 corresponds to a part A of the building, and a point $A^R$ in the image 2 also corresponds to the part A of the building. A point $B^L$ corresponds to apart B of the building, and a point $B^R$ also corresponds to the part B of the building. A parallax of the binocular camera for the part A of the building is $x_{L1}-x_{R1}$. A parallax of the binocular camera for the part B of the building is $x_{L2}-x_{R2}$.

To sum up, when there are more features in the first image information and the second image information, it is easier to obtain more same features from the two pieces of image information, so that the depth information of the target object that is obtained by the electronic device 100 is more accurate.

In this embodiment of this application, after the infrared projector 101 emits the infrared light with the light spot to the target object, the image information of the target object that is collected by the first camera 102 and the second camera 103 may not only include a feature of the target object, but also include a texture feature formed when the infrared light with the light spot is irradiated onto the target object. That is, a quantity of features in images of the target object that are collected by the first camera 102 and the second camera 103 can be increased. After the quantity of features in images of the target object that are collected by the first camera 102 and the second camera 103 is increased, the electronic device 100 can more accurately identify a same feature in the image information collected by the first camera 102 and the image information collected by the second camera 103, and further determine a parallax between the first camera 102 and the second camera 103 for the same feature and calculate a depth of each point, to obtain the depth information of the target object. This can improve accuracy of the depth information of the target object that is calculated by the electronic device 100.

In this embodiment of this application, the dual-pass camera may be obtained by improving an RGB camera, so that hardware costs of the electronic device 100 can be reduced. Specifically, an antireflection coating may be plated on each of two sides of each lens of the RGB camera, to improve a capability of the lens to sense infrared light, so that the lens can receive infrared light as much as possible; and a cut-off coating may be plated on a light filter of the RGB camera, to filter out light other than infrared light and visible light, and increase a transmittance of infrared light. An RGB camera including the antireflection coating and the cut-off coating not only can receive visible light, but also can receive infrared light. The RGB camera improved in the foregoing manner may be used as a dual-pass camera.

It should be noted that, in some embodiments, the partial schematic diagram of the electronic device 100 shown in FIG. 1A may be a partial schematic diagram of a front side of the electronic device 100. In other words, the infrared projector 101, the first camera 102, and the second camera 103 are disposed on the front side of the electronic device 100.

In addition to the first camera 102 and the second camera 103, the electronic device 100 may further include one or more other cameras. The one or more other cameras may include a third camera 104, and the third camera is an RGB camera. The third camera is configured to collect a two-dimensional image of the target object. The electronic device 100 may display, on a display screen, the two-dimensional image collected by the third camera. The third camera 104, the first camera 102, the second camera 103, and the infrared projector are disposed on a same side of the electronic device 100. That is, the third camera 104 may also be disposed on the front side of the electronic device 100. The third camera 104 is a front-facing camera of the electronic device 100.

In some other embodiments, the partial schematic diagram of the electronic device 100 shown in FIG. 1A may be a partial schematic diagram of a rear side of the electronic device 100. In other words, the infrared projector 101, the first camera 102, the second camera 103, and the RGB camera 104 are disposed on the rear side of the electronic device 100. The RGB camera 104 is a rear-facing camera of the electronic device 100.

The front side of the electronic device 100 is a side on which the electronic device 100 displays a graphical user interface (for example, a home screen of the electronic device 100, that is, a desktop), that is, a side on which a display panel is located is usually referred to as the front side. The rear side of the electronic device 100 is a side facing a direction opposite to a direction that the front side faces. Usually, the front side of the electronic device is a side facing a user when the electronic device is normally used by the user, and a side against the user is referred to as the rear side.

Certainly, the one or more other cameras may further include another RGB camera or black-and-white camera, or the like. The another RGB camera or black-and-white camera or the like may be a front-facing camera or a rear-facing camera of the electronic device 100. This is not limited in this embodiment of this application.

For example, in this embodiment of this application, the electronic device may be a portable computer (for example, a mobile phone), a notebook computer, a wearable electronic device (for example, a smartwatch), a tablet computer, an augmented reality (augmented reality, AR)/virtual reality (virtual reality, VR) device, an in-vehicle device, or the like that includes the infrared projector, the RGB camera (that is, the third camera), and the two dual-pass cameras (that is, the first camera and the second camera). A specific form of the electronic device is not particularly limited in the following embodiments.

Figure 1D:
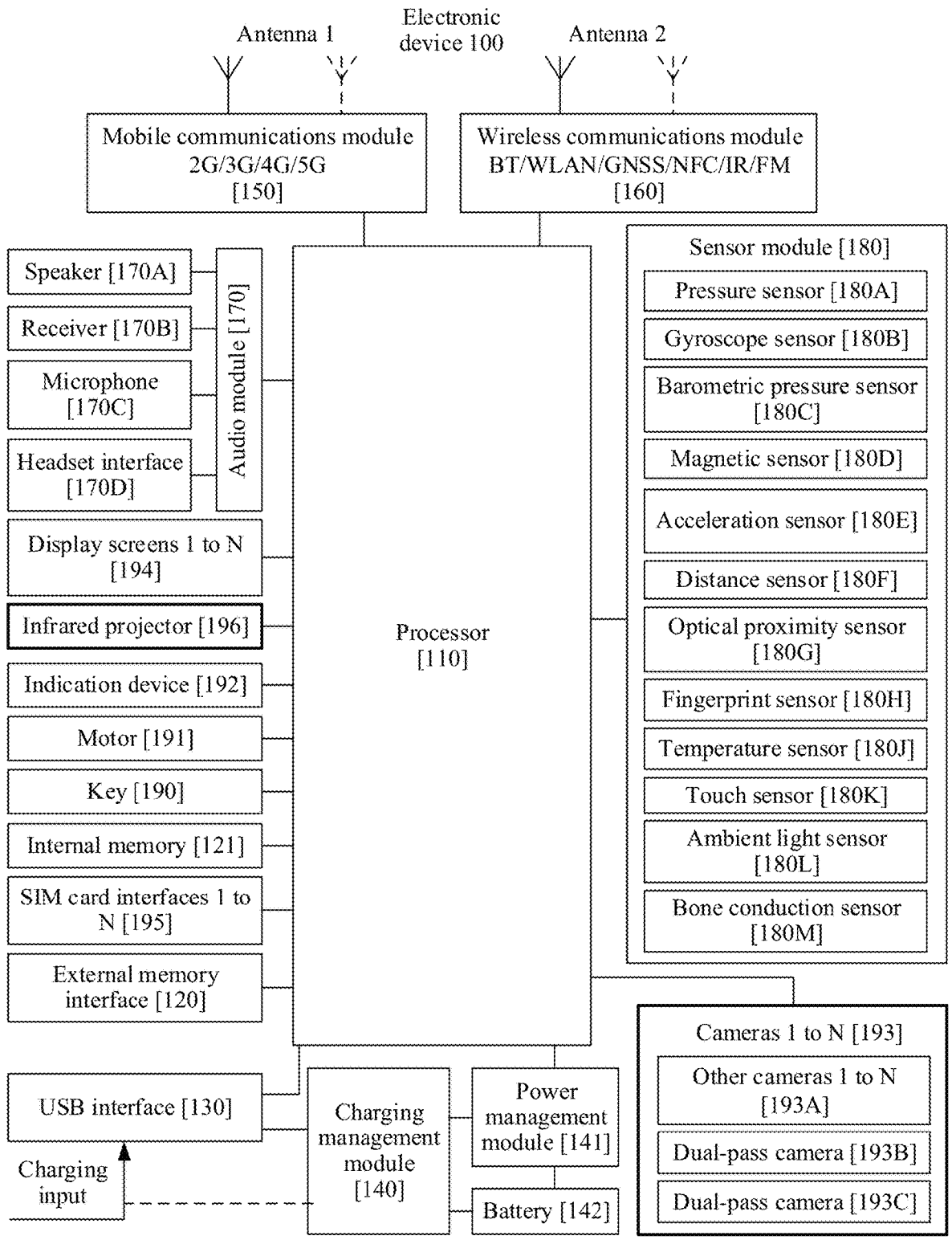
FIG. 1D is a schematic diagram of a hardware structure of an electronic device according to an embodiment of this application.

FIG. 1D is a schematic structural diagram of an electronic device 100 according to an embodiment of this application. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset interface 170D, a sensor module 180, a key 190, a motor 191, an indication device 192, a camera 193, a display screen 194, a subscriber identification module (subscriber identification module, SIM) card interface 195, and the like.

The electronic device 100 may further include an infrared projector 196 (for example, the infrared projector 101 shown in FIG. 1A). The infrared projector 196 is configured to emit infrared light with a light spot. For example, the infrared projector 196 may emit infrared light with a wavelength of 940 nm, and the infrared light has a light spot. For a shape and an arrangement of light spots, refer to subsequent related descriptions in the embodiments of this application. Details are not described herein.

The camera 193 may include two dual-pass cameras (for example, the first camera 102 and the second camera 103 shown in FIG. 1A) 193B and 193C, and 1 to N other cameras 193A. The 1 to N other cameras 193A may include the third camera 104 shown in FIG. 1A, that is, an RGB camera, and may further include another camera, for example, a black-and-white camera. The dual-pass cameras 193B and 193C may receive visible light and infrared light. The RGB camera is configured to collect an RGB image, for example, a human face image (that is, a two-dimensional human face image).

The sensor module 180 may include a plurality of sensors such as a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and a bone conduction sensor 180M.

It can be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be separate devices, or may be integrated into one or more processors.

The controller may be a nerve center and a command center of the electronic device 100. The controller may generate an operation control signal based on an instruction operation code and a time sequence signal, to control obtaining of an instruction and execution of the instruction.

A memory may be further disposed in the processor 110 to store an instruction and data. In some embodiments, the memory in the processor 110 is a cache. The memory may store an instruction or data just used or cyclically used by the processor 110. If the processor 110 needs to use the instruction or the data again, the processor 110 may directly invoke the instruction or the data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronous serial bus, including a serial data line (serial data line, SDL) and a serial clock line (serial clock line, SCL). In some embodiments, the processor 110 may include a plurality of I2C buses. The processor 110 may be coupled to the touch sensor 180K, a charger, a flash, the camera 193, and the like separately by using different I2C bus interfaces. For example, the processor 110 may be coupled to the touch sensor 180K by using an I2C interface, so that the processor 110 communicates with the touch sensor 180K by using the I2C bus interface, to implement a touch function of the electronic device 100.

The I2S interface may be used for audio communication. In some embodiments, the processor 110 may include a plurality of I2S buses. The processor 110 may be coupled to the audio module 170 by using an I2S bus, to implement communication between the processor 110 and the audio module 170. In some embodiments, the audio module 170 may transmit an audio signal to the wireless communications module 160 by using the I2S interface, to implement a function of answering a call by using a Bluetooth headset.

The PCM interface may also be used for audio communication, to sample, quantize, and encode an analog signal. In some embodiments, the audio module 170 may be coupled to the wireless communications module 160 by using the PCM bus interface. In some embodiments, the audio module 170 may also transmit an audio signal to the wireless communications module 160 by using the PCM interface, to implement a function of answering a call by using a Bluetooth headset. Both the I2S interface and the PCM interface may be used for audio communication.

The UART interface is a universal serial data bus used for asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 by using the UART interface, to implement a Bluetooth function. In some embodiments, the audio module 170 may transmit an audio signal to the wireless communications module 160 by using the UART interface, to implement a function of playing music by using a Bluetooth headset.

The MIPI interface may be configured to connect the processor 110 to a peripheral device such as the display screen 194 or the camera 193. The MIPI interface includes a camera serial interface (camera serial interface, CSI), a display serial interface (display serial interface, DSI), and the like. In some embodiments, the processor 110 communicates with the camera 193 by using the CSI interface, to implement a photographing function of the electronic device 100; and the processor 110 communicates with the display screen 194 by using the DSI interface, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display screen 194, the wireless communications module 160, the audio module 170, the sensor module 180, or the like. The GPIO interface may be alternatively configured as an I2C interface, an I2S interface, a UART interface, an MIPI interface, or the like.

The USB interface 130 is an interface that complies with a USB standard specification, and may be specifically a mini USB interface, a micro USB interface, a USB Type C interface, or the like. The USB interface 130 may be configured to connect to a charger to charge the electronic device 100, or may be configured to transmit data between the electronic device 100 and a peripheral device, or may be configured to connect to a headset to play an audio file by using the headset. Alternatively, the interface may be configured to connect to another electronic device, for example, an AR device.

It can be understood that an interface connection relationship between the modules shown in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive charging input from a charger. The charger may be a wireless charger, or may be a wired charger. In some embodiments of wired charging, the charging management module 140 may receive charging input from a wired charger by using the USB interface 130. In some embodiments of wireless charging, the charging management module 140 may receive wireless charging input by using a wireless charging coil of the electronic device 100. When the charging management module 140 charges the battery 142, the power management module 141 may further supply power to the electronic device.

The power management module 141 is configured to connect to the battery 142, the charging management module 140, and the processor 110. The power management module 141 receives input from the battery 142 and/or the charging management module 140, and supplies power to the processor 110, the internal memory 121, an external memory, the display screen 194, the camera 193, the wireless communications module 160, and the like. The power management module 141 may be further configured to monitor parameters such as a battery capacity, a quantity of battery cycles, and a battery health status (electric leakage and impedance). In some other embodiments, the power management module 141 may be alternatively disposed in the processor 110. In some other embodiments, the power management module 141 and the charging management module 140 may be alternatively disposed in a same device.

A wireless communication function of the electronic device 100 may be implemented by the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna of a wireless local area network. In some other embodiments, an antenna may be used in combination with a tuning switch.

The mobile communications module 150 may provide a solution that is applied to the electronic device 100 and that includes wireless communications technologies such as 2G, 3G, 4G, and 5G. The mobile communications module 150 may include at least one light filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert an amplified signal into an electromagnetic wave and radiate the electromagnetic wave by using the antenna 1. In some embodiments, at least some functional modules of the mobile communications module 150 may be disposed in the processor 110. In some embodiments, at least some functional modules of the mobile communications module 150 and at least some modules of the processor 110 may be disposed in a same device.

The modem processor may include a modulator and a demodulator. The modulator is configured to modulate a to-be-sent low-frequency baseband signal into an intermediate- or high-frequency signal. The demodulator is configured to demodulate a received electromagnetic wave signal into a low-frequency baseband signal. Then the demodulator transmits the low-frequency baseband signal obtained through demodulation to the baseband processor for processing. The low-frequency baseband signal is processed by the baseband processor, and a processed signal is transmitted to the application processor. The application processor outputs a sound signal by using an audio device (not limited to the speaker 170A, the receiver 170B, and the like), or displays an image or a video by using the display screen 194. In some embodiments, the modem processor may be an independent component. In some other embodiments, the modem processor may be independent of the processor 110, and is disposed in a same device with the mobile communications module 150 or another functional module.

The wireless communications module 160 may provide a solution that is applied to the electronic device 100 and that includes wireless communications technologies such as a wireless local area network (wireless local area networks, WLAN) (for example, a Wi-Fi network), Bluetooth (blue tooth, BT), a global navigation satellite system (global navigation satellite system, GNSS), frequency modulation (frequency modulation, FM), NFC, and an infrared (infrared, IR) technology. The wireless communications module 160 may be one or more devices that integrate at least one communications processing module. The wireless communications module 160 receives an electromagnetic wave by using the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave and radiate the electromagnetic wave by using the antenna 2.

In some embodiments, the antenna 1 of the electronic device 100 is coupled to the mobile communications module 150, and the antenna 2 is coupled to the wireless communications module 160, so that the electronic device 100 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite-based augmentation system (satellite based augmentation systems, SBAS).

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculation, and is used for graphics rendering. The processor 110 may include one or more GPUs that execute a program instruction to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flex light-emitting diode, FLED), Miniled, MicroLed, Micro-oLed, a quantum dot light-emitting diode (quantum dot light emitting diodes, QLED), or the like. In some embodiments, the electronic device 100 may include one or N display screens 194, where N is a positive integer greater than 1.

The electronic device 100 may implement a photographing function by using the ISP, the camera 193, the video codec, the GPU, the display screen 194, the application processor, and the like.

The ISP is mainly configured to process data fed back by the camera 193. For example, during photographing, a shutter is opened, light is transmitted to a photosensitive element of the camera through a lens, an optical signal is converted into an electrical signal, and the photosensitive element of the camera transmits the electrical signal to the ISP for processing, to convert the electrical signal into an image visible to a naked eye. The ISP may further optimize noise, luminance, and complexion of the image based on an algorithm. The ISP may further optimize parameters such as exposure and color temperature of a photographing scenario. In some embodiments, the ISP may be disposed in the camera 193.

The camera 193 is configured to capture a static image or a video. An optical image is generated for an object by using the lens, and the optical image is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal. In addition to a digital image signal, the digital signal processor may further process another digital signal. For example, when the electronic device 100 selects a frequency, the digital signal processor is configured to perform Fourier transformation and the like on frequency energy.

The video codec is configured to compress or decompress a digital video. The electronic device 100 may support one or more types of video codecs. In this way, the electronic device 100 may play or record videos in a plurality of encoding formats, for example, moving picture experts group (moving picture experts group, MPEG)1, MPEG2, MPEG3, and MPEG4.

The NPU is a neural-network (neural-network, NN) computing processor. The NPU quickly processes input information with reference to a structure of a biological neural network, for example, with reference to a transfer mode between human brain neurons, and may further continuously perform self-learning. The NPU may implement applications such as intelligent cognition of the electronic device 100, for example, image recognition, facial recognition, speech recognition, and text comprehension.

The external memory interface 120 may be configured to connect to an external storage card, for example, a micro SD card, to extend a storage capability of the electronic device 100. The external storage card communicates with the processor 110 by using the external memory interface 120, to implement a data storage function. For example, files such as music and videos are stored in the external storage card.

The internal memory 121 may be configured to store computer executable program code, where the executable program code includes an instruction. The processor 110 performs various functional applications and data processing of the electronic device 100 by running the instruction stored in the internal memory 121. The internal memory 121 may include a program storage area and a data storage area. The program storage area may store an operating system, an application program required by at least one function (for example, a sound play function or an image play function), and the like. The data storage area may store data (for example, audio data and a phone book) created in a process of using the electronic device 100, and the like. In addition, the internal memory 121 may include a high-speed random access memory, or may include a nonvolatile memory, for example, at least one magnetic disk storage device, a flash storage device, or a universal flash storage (universal flash storage, UFS).

The electronic device 100 may implement audio functions, for example, music playing and recording, by using the audio module 170, the speaker 170A, the receiver 170B, the microphone 170C, the headset interface 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may be used to listen to music or answer a hands-free call by using the speaker 170A.

The receiver 170B, also referred to as an "earpiece", is configured to convert an audio electrical signal into a sound signal. When the electronic device 100 is used to answer a call or listen to voice information, the receiver 170B may be placed close to a human ear to listen to a voice.

The microphone 170C, also referred to as a "mike" or a "mic", is configured to convert a sound signal into an electrical signal. When making a call or sending voice information, a user may move a mouth close to the microphone 170C and make a sound, to input a sound signal into the microphone 170C. At least one microphone 170C may be disposed in the electronic device 100. In some other embodiments, two microphones 170C may be disposed in the electronic device 100, to implement a noise reduction function, in addition to collecting a sound signal. In some other embodiments, three, four, or more microphones 170C may be alternatively disposed in the electronic device 100, to collect a sound signal and reduce noise. The microphones may further identify a sound source, implement a directional recording function, and the like.

The headset interface 170D is configured to connect to a wired headset. The headset interface 170D may be a USB interface 130, or may be a 3.5-mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed in the display screen 194. There are many types of pressure sensors 180A, for example, a resistive pressure sensor, an inductive pressure sensor, and a capacitive pressure sensor. The capacitive pressure sensor may include at least two parallel plates that have conductive materials. When a force acts on the pressure sensor 180A, capacitance between electrodes changes. The electronic device 100 determines pressure strength based on the capacitance change. When a touch operation acts on the display screen 194, the electronic device 100 detects strength of the touch operation based on the pressure sensor 180A. The electronic device 100 may also calculate a touch position based on a detection signal of the pressure sensor 180A. In some embodiments, touch operations acting on a same touch position but having different touch operation strength may correspond to different operation instructions. For example, when a touch operation whose touch operation strength is less than a first pressure threshold acts on an icon of an SMS application, an instruction for viewing an SMS message is executed; or when a touch operation whose touch operation strength is greater than or equal to the first pressure threshold acts on the icon of the SMS application, an instruction for creating an SMS message is executed.

The gyroscope sensor 180B may be configured to determine a motion posture of the electronic device 100. In some embodiments, an angular velocity of the electronic device 100 around three axes (that is, an x-axis, a y-axis, and a z-axis) may be determined by using the gyroscope sensor 180B. The gyroscope sensor 180B may be used for image stabilization during photographing. For example, when the shutter is pressed, the gyroscope sensor 180B detects an angle at which the electronic device 100 shakes, and calculates, based on the angle, a distance for which a lens module needs to compensate, so that the lens cancels the shake of the electronic device 100 through reverse motion, thereby implementing image stabilization. The gyroscope sensor 180B may be further used in navigation and motion sensing game scenarios.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall effect sensor. The electronic device 100 may detect opening/closing of a clamshell leather case by using the magnetic sensor 180D. In some embodiments, when the electronic device 100 is a clamshell phone, the electronic device 100 may detect opening/closing of a clamshell based on the magnetic sensor 180D. Further, a feature, such as automatic unlocking upon flipping, is set based on a detected open/closed state of a leather case or a detected open/closed state of the clamshell.

The acceleration sensor 180E may detect a magnitude of an acceleration of the electronic device 100 in each direction (usually, three axes). When the electronic device 100 is still, a magnitude and a direction of gravity may be detected. The acceleration sensor 180E may be further configured to identify a posture of the electronic device, and is applied to applications such as landscape/portrait mode switching and a pedometer.

The distance sensor 180F is configured to measure a distance. The electronic device 100 may measure a distance by using an infrared or laser. In some embodiments, in a photographing scenario, the electronic device 100 may measure a distance by using the distance sensor 180F, to implement fast focusing.

The optical proximity sensor 180G may include, for example, a light emitting diode (LED) and an optical detector, for example, a photodiode. The light emitting diode may be an infrared light emitting diode. The electronic device 100 emits infrared light by using the light emitting diode. The electronic device 100 detects, by using the photodiode, infrared reflected light that comes from a nearby object. When detecting sufficient reflected light, the electronic device 100 may determine that there is an object near the electronic device 100; or when detecting insufficient reflected light, the electronic device 100 may determine that there is no object near the electronic device 100. The electronic device 100 may detect, by using the optical proximity sensor 180G, that a user holds the electronic device 100 close to an ear for a call, so as to automatically turn off the screen to save power. The optical proximity sensor 180G may also be used for automatic screen locking or unlocking in a leather case mode or a pocket mode.

The ambient light sensor 180L is configured to sense luminance of ambient light. The electronic device 100 may adaptively adjust luminance of the display screen 194 based on the sensed luminance of ambient light. The ambient light sensor 180L may also be configured to automatically adjust white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may implement fingerprint-based unlocking, accessing application lock, fingerprint-based photographing, fingerprint-based call answering, and the like by using a collected fingerprint characteristic.

The temperature sensor 180J is configured to detect temperature. In some embodiments, the electronic device 100 executes a temperature processing policy by using the temperature detected by the temperature sensor 180J. For example, when temperature reported by the temperature sensor 180J exceeds a threshold, the electronic device 100 degrades performance of a processor near the temperature sensor 180J, to reduce power consumption and implement thermal protection. In some other embodiments, when temperature is lower than another threshold, the electronic device 100 heats up the battery 142, to avoid abnormal shutdown of the electronic device 100 due to low temperature. In some other embodiments, when temperature is lower than still another threshold, the electronic device 100 boosts an output voltage of the battery 142 to avoid abnormal shutdown due to low temperature.

The touch sensor 180K is also referred to as a "touch panel". The touch sensor 180K may be disposed in the display screen 194, and the touch sensor 180K and the display screen 194 form a touchscreen, which is also referred to as a "touch control screen". The touch sensor 180K is configured to detect a touch operation acting on or near the touch sensor. The touch sensor may transmit the detected touch operation to the application processor, to determine a type of a touch event. Visual output related to the touch operation may be provided by using the display screen 194. In some other embodiments, the touch sensor 180K may be alternatively disposed on a surface of the electronic device 100, and is at a position different from that of the display screen 194.

The bone conduction sensor 180M may obtain a vibration signal. In some embodiments, the bone conduction sensor 180M may obtain a vibration signal from a vibration bone of a human voice part. The bone conduction sensor 180M may also be in contact with a human pulse, and receive a blood pressure and pulse signal. In some embodiments, the bone conduction sensor 180M may be alternatively disposed in a headset to form a bone conduction headset. The audio module 170 may parse out a speech signal based on the vibration signal obtained by the bone conduction sensor 180M from the vibration bone of the voice part, to implement a speech function. The application processor may parse out heart rate information based on the blood pressure and pulse signal obtained by the bone conduction sensor 180M, to implement a heart rate detection function.

The key 190 includes a power key, a volume key, or the like. The key 190 may be a mechanical key, or may be a touch key. The electronic device 100 may receive key input, and generate key signal input related to user settings and function control of the electronic device 100.

The motor 191 may produce a vibration prompt. The motor 191 may be configured to produce a vibration prompt for an incoming call, or may be configured to produce a vibration feedback on a touch. For example, touch operations acting on different applications (for example, photographing and audio playing) may correspond to different vibration feedback effects. For touch operations acting on different regions on the display screen 194, the motor 191 may also correspondingly produce different vibration feedback effects. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a battery level change, or may be configured to indicate a message, a missed call, a notification, or the like.

The SIM card interface 195 is configured to connect to a SIM card. The SIM card may be inserted in the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano SIM card, a micro SIM card, a SIM card, and the like. A plurality of cards may be inserted in one SIM card interface 195. The plurality of cards may be of a same type, or may be of different types. The SIM card interface 195 may also be compatible with different types of SIM cards. The SIM card interface 195 may also be compatible with an external storage card. The electronic device 100 interacts with a network by using the SIM card, to implement functions such as a call and data communication. In some embodiments, the electronic device 100 uses an eSIM, that is, an embedded SIM card. The eSIM card may be embedded in the electronic device 100, and cannot be separated from the electronic device 100.

Figure 2:
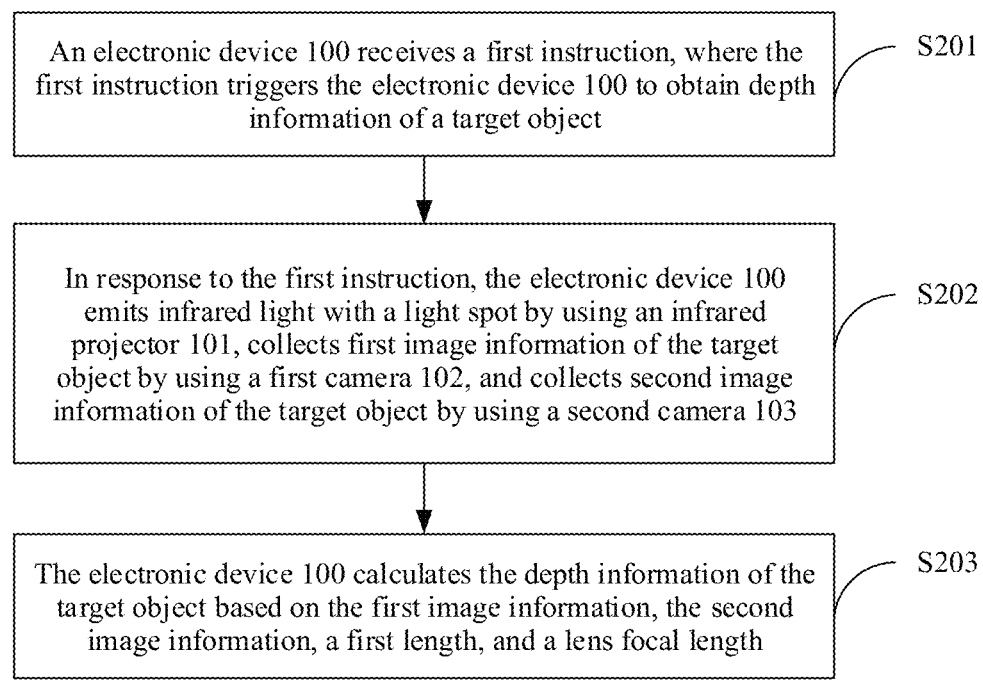
FIG. 2 is a flowchart 1 of a method for obtaining depth information according to an embodiment of this application.

An embodiment of this application provides a method for obtaining depth information. The method may be applied to an electronic device 100. The electronic device 100 includes an infrared projector 101, a first camera 102, and a second camera 103. For example, as shown in FIG. 1A, lens focal lengths of the first camera 102 and the second camera 103 are both f, and a distance (that is, a first length) between the first camera 102 and the second camera 103 is T. As shown in FIG. 2, the method for obtaining depth information may include S201 to S203.

S201. The electronic device 100 receives a first instruction, where the first instruction triggers the electronic device 100 to obtain depth information of a target object.

The electronic device 100 may receive a first operation of a user, and the first operation is used to trigger the electronic device 100 to perform a first event. The electronic device 100 needs to use the depth information of the target object to perform the first event. Therefore, in response to the first operation, the electronic device 100 may obtain the first instruction, and the first instruction may trigger the electronic device 100 to obtain the depth information of the target object.

For example, the method in this embodiment of this application may be applied to a plurality of scenarios such as a face-based unlocking scenario, a face-based payment scenario, an AR scenario, a 3D modeling scenario, and a wide aperture scenario.

In the face-based unlocking scenario, it is assumed that the electronic device 100 has been powered on and a screen of the electronic device 100 is off. The first operation may be a hit operation (for example, a single-hit operation) performed by the user on a related physical key of the electronic device 100. For example, the related physical key may be a lock-screen key or a home key. If the electronic device 100 receives the first operation performed by the user on the physical key, it indicates that the user may be intended to unlock the electronic device 100.

Alternatively, the electronic device 100 may include one or more sensors configured to detect a status of the electronic device 100 being handheld by the user. It is assumed that the electronic device 100 has been powered on and the screen of the electronic device 100 is off or a lock-screen interface is displayed on the electronic device 100. That the electronic device 100 receives the first operation may be specifically as follows: The sensor detects that a current status of the electronic device 100 being handheld by the user undergoes a change satisfying a preset condition. When the status of the electronic device 100 being handheld by the user undergoes a change satisfying the preset condition (for example, the electronic device 100 is picked up by the user, and the user holds the electronic device 100 so that an included angle between a display screen of the electronic device 100 and a horizontal plane falls within a specific range), it indicates that the user may be intended to unlock the electronic device 100.

In other words, the first operation may be used to trigger the electronic device 100 to perform unlocking (that is, perform the first event). Before the electronic device 100 is unlocked, user identity verification needs to be performed. Facial recognition is a manner of user identity verification. To perform facial recognition, the electronic device 100 may obtain the depth information of the target object.

In this embodiment of this application, the one or more sensors may determine, by detecting that the electronic device 100 is rotated, the electronic device 100 moves forward relative to the user, or the electronic device 100 moves upward relative to a horizon, whether the status of the electronic device 100 being handheld by the user undergoes a change satisfying the preset condition. Specifically, the electronic device 100 may detect a motion parameter of the electronic device 100; then determine, based on the motion parameter, whether the electronic device 100 is rotated, whether the electronic device 100 moves forward relative to the user, and whether the electronic device 100 moves upward relative to the horizon; and finally determine, based on a determining result, whether the status of the electronic device 100 being handheld by the user undergoes a change satisfying the preset condition.

For example, in this embodiment, that "a current status of the electronic device 100 being handheld by the user undergoes a change satisfying a preset condition" may specifically include: After the sensor detects that the electronic device 100 is rotated and moves upward, the included angle between the display screen of the electronic device 100 and the horizontal plane falls within a preset range.

It should be noted that, because different users have different photographing habits, the electronic device 100 may collect statistics on status change parameters collected by the sensor in a process in which most or all users use the electronic device 100 to collect human face images, and determine changes of the status change parameters as changes satisfying the preset condition. In this way, the electronic device 100 may determine, in response to that the changes of the status change parameters collected by the sensor in the electronic device 100 satisfies the changes of the preset condition, that a possibility that the user wants to unlock the electronic device 100 is comparatively high. In this case, S202 may be performed.

Figure 3A:
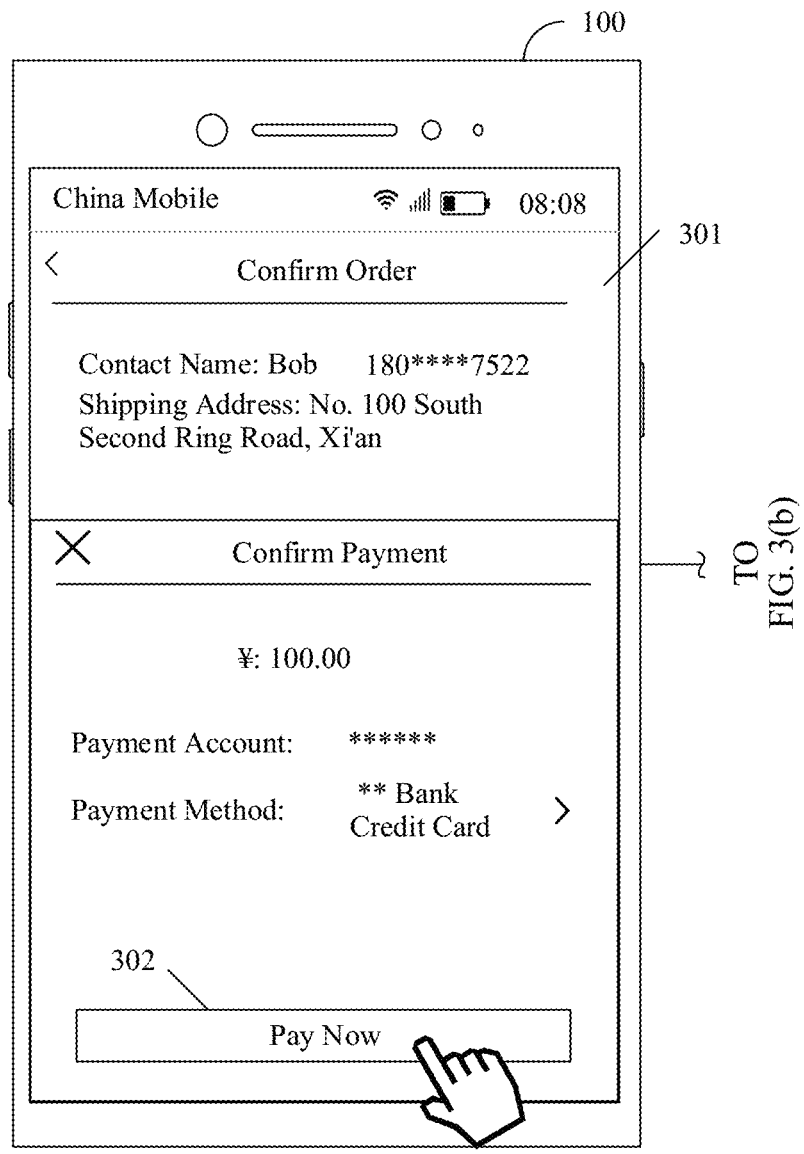
FIG. 3(a) and FIG. 3(b) are a schematic diagram 1 of an example of a graphical user interface according to an embodiment of this application.
Figure 3B:
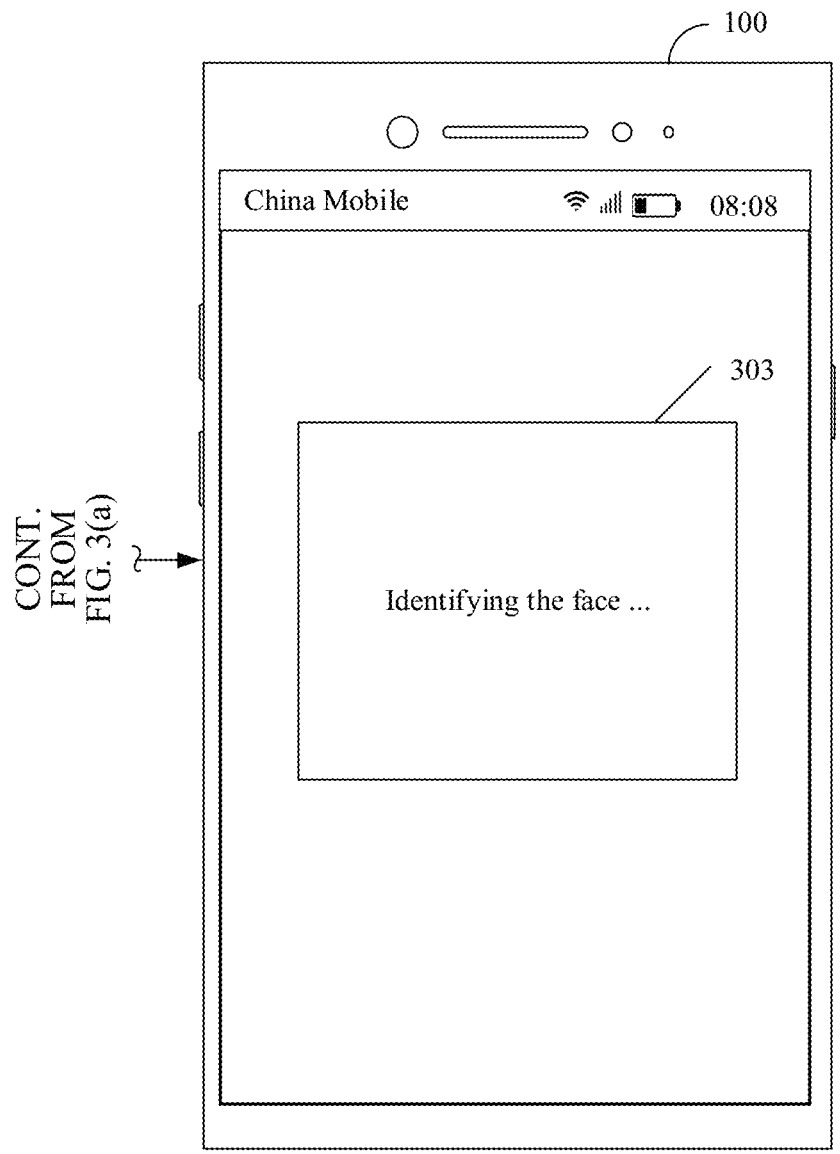

For example, in the face-based payment scenario, the first operation may be a touch operation (for example, a single-touch operation) performed by the user on a payment button on a payment interface. For example, a payment interface 301 shown in FIG. 3(a) includes a "Pay Now" payment button 302, and the first operation may be a single-touch operation performed by the user on the "Pay Now" button 302. Alternatively, the first operation may be a preset gesture entered by the user on the payment interface, for example, an S-shaped gesture. In response to the first operation, the electronic device 100 may pay for an order (that is, perform the first event). However, before the electronic device 100 pays for the order, user identity verification needs to be performed. Facial recognition is a manner of user identity verification. To perform facial recognition, the electronic device 100 may obtain the depth information of the target object. In response to the single-touch operation performed by the user on the "Pay Now" button 302, the electronic device 100 may display a facial recognition interface 303 shown in FIG. 3(b).

S202. In response to the first instruction, the electronic device 100 emits infrared light with a light spot by using the infrared projector 101, collects first image information of the target object by using the first camera 102, and collects second image information of the target object by using the second camera 103.

In response to the first instruction, the electronic device 100 may turn on the infrared projector 101, and turn on the first camera 102 and the second camera 103. After the electronic device 100 turns on the infrared projector 101, the infrared projector 101 may emit the infrared light with the light spot. After the electronic device 100 turns on and initializes the first camera 102 and the second camera 103, the first camera 102 and the second camera 103 may collect the image information of the target object.

In this embodiment of this application, the infrared projector 101 emits the infrared light with the light spot to the target object, and the infrared light with the light spot is irradiated onto the target object. This can increase a quantity of features (that is, texture features) of the target object, and increase a rate of identifying each feature of the target object by the first camera 102 and the second camera 103.

In this embodiment of this application, the infrared light with the light spot that is emitted by the infrared projector 101 and a principle of emitting the infrared light with the light spot by the infrared projector 101 are described herein.

Generally, infrared light is invisible to human eyes. However, some infrared light (for example, infrared light of 850 nm) has an obvious red light feature, and a small amount of red light is still visible to human eyes. If the infrared projector 101 emits this type of infrared light to the target object, the user may see the infrared light irradiated onto the target object, thereby affecting visual experience of the user.

To prevent the infrared light emit by the infrared projector 101, to the target object from affecting visual experience of the user, the infrared light emitted by the infrared projector 101 may be infrared light that is completely invisible to human eyes. For example, the infrared light emitted by the infrared projector 101 may be infrared light of 890 nm to 990 nm, and is specifically, for example, infrared light of 940 nm.

Exposure of some cameras (for example, a rolling shutter (rolling shutter) camera) is performed line by line. Therefore, if exposure of the first camera 102 and the second camera 103 is performed line by line, the infrared projector 101 needs to be turned on to emit the infrared light with the light spot during an entire exposure period of the first camera 102 and the second camera 103. Otherwise, there may be no light spot on some images in the image information collected by the first camera 102 and the second camera 103 during the exposure. In this case, it is required that an operating power of the infrared projector 101 not be excessively high, to avoid that the infrared projector 101 heats up and has a comparatively high temperature due to an excessively high operating power of the infrared projector 101, thereby affecting efficiency of emitting the infrared light by the infrared projector 101 (that is, affecting brightness of the infrared light), and further affecting an effect of a texture feature formed when the infrared light with the light spot is irradiated onto the object.

Certainly, the operating power of the infrared projector 101 cannot be excessively low either. If the operating power of the infrared projector 101 is excessively low, efficiency of emitting the infrared light by the infrared projector 101 is also affected, and further, an effect of a texture feature formed when the infrared light with the light spot is irradiated onto the object is affected.

To sum up, to ensure the effect of the texture feature formed when the infrared light is irradiated onto the object, the power of the infrared projector 101 should not be excessively high or excessively low. To stabilize the power of the infrared projector 101, an operating current of the infrared projector 101 may range from 100 mA to 200 mA. For example, the operating current of the infrared projector 101 may be 150 mA.

Generally, an infrared projector may include three parts: (1) an infrared light source; (2) a collimating mirror; and (3) a diffractive optical element (diffractive optical elements, DOE).

The infrared light source may be a laser light source. For example, the laser light source may be a vertical cavity surface emitting laser (vertical cavity surface emitting laser, VCSEL). The VCSEL may emit the foregoing infrared light.

The collimating mirror may be a 1P lens or a 2P lens. That the collimating mirror is a 1P lens means that the collimating mirror includes one lens. The 2P lens means that the collimating mirror includes two lenses. The collimating mirror is configured to convert non-parallel light into approximately parallel light sources. This conversion can reduce a noise level of a texture of infrared light emitted by the infrared projector, that is, can reduce light of a non-texture part. In other words, this conversion can make a bright dot in the infrared light emitted by the infrared projector brighter and a dark dot in the infrared light emitted by the infrared projector darker.

When visible light is comparatively strong in the daytime, the texture feature formed when the infrared light with the light spot is irradiated onto the target object is almost invisible in the image information collected by the first camera 102 and the second camera 103. In this case, when identifying a same feature in the two pieces of image information, the electronic device 100 may perform determining based on a feature of the target object. Therefore, a bright dot obtained by the collimating mirror by converting the light has no impact on depth calculation.

In this embodiment of this application, a collimating mirror may be omitted in the infrared projector 101. To be specific, in this embodiment of this application, the infrared projector 101 may not include a collimating mirror, and include only an infrared light source and a DOE. The collimating mirror is configured to make light emitted by the VCSEL become approximately parallel light after the light passes through the collimating mirror. In this way, when there is a collimating mirror, after light passes through the DOE, a light spot diameter is small, and a contrast is high (that is, brightness of a light spot region is high, and brightness of a non-light spot region is low). Therefore, when intensity of visible light is very low or in a case of pure darkness (for example, at night), a target object illuminated by a projector turns black or is invisible in a region without a spot or a light spot. A reason is that light spots and light of a projector with a collimating mirror is more concentrated, and a place without a light spot is theoretically lightless or has only faint ambient light. If the collimating mirror is removed from the infrared projector, because light is not parallel light before entering the DOE, a contrast of a light spot is low, and a part of light still exists in a non-light spot region. A projector without a collimating mirror is a noise in projector design. However, in this embodiment of this application, accuracy of measuring depth information can be improved. For a projector without a collimating mirror, in a case of weak visible light or pure darkness, in a region that is of a target object and onto which a light spot is irradiated, the target object may be illuminated by the light spot; in a region not illuminated by a light spot, because of this noise, comparatively weak light is also irradiated onto the target object. In this case, the target object is visible as a whole. Therefore, a feature of the target object can be more obvious, and accuracy of measuring depth information can be improved.

The DOE is configured to convert, by using a Fourier optical principle, parallel light into a required light output form. The output form may be a point, a line, or a surface. In this embodiment of this application, the DOE may be disposed to control the infrared projector to emit the infrared light with the light spot. A shape, a quantity, and an arrangement of light spots may all be implemented by disposing the DOE.

Figure 4:
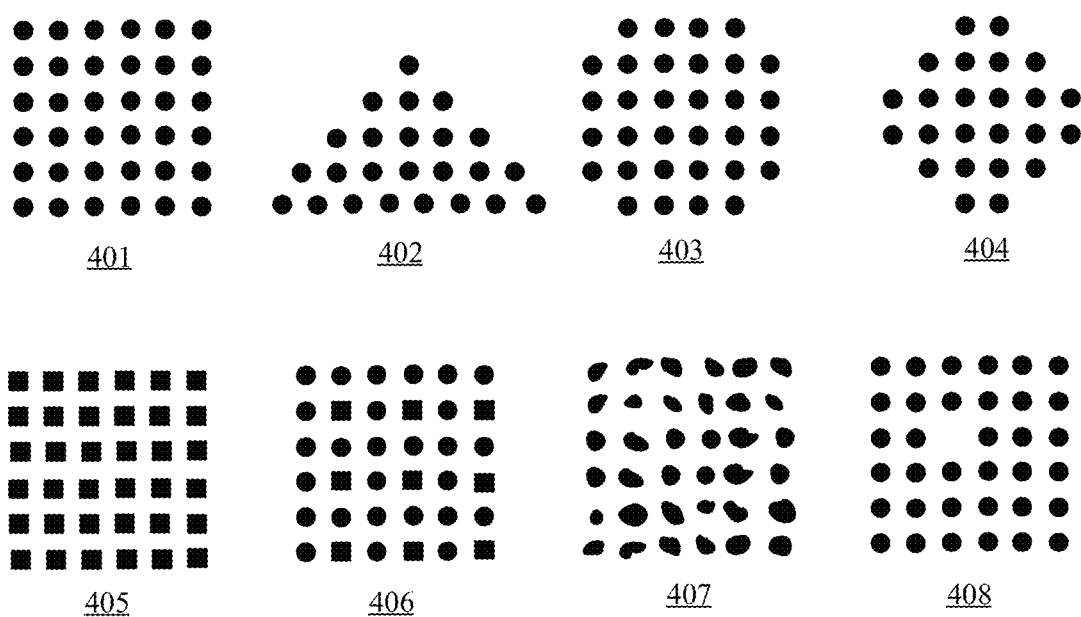
FIG. 4 is a schematic diagram of an example of a speckle lattice according to an embodiment of this application.

Specifically, the infrared light emitted by the infrared projector 101 may include a plurality of light spots. The plurality of light spots may include a plurality of speckle lattice groups. One speckle lattice group includes one or more speckle lattices, and each speckle lattice includes a plurality of speckles. FIG. 4 is a schematic diagram of an example of a plurality of speckle lattices according to an embodiment of this application. For example, a speckle lattice 401 shown in FIG. 4 is a speckle lattice including a plurality of circular speckles.

In some embodiments, a plurality of speckles in a speckle lattice may have a same shape. For example, speckles in the speckle lattice 401, a speckle lattice 402, a speckle lattice 403, a speckle lattice 404, and a speckle lattice 408 shown in FIG. 4 are all circular. All speckles in a speckle lattice 405 shown in FIG. 4 are rectangular.

In some other embodiments, at least two of a plurality of speckles in a speckle lattice have different shapes. For example, a speckle lattice 406 shown in FIG. 4 includes a circular speckle and a rectangular speckle. A speckle lattice 407 shown in FIG. 4 includes a plurality of speckles of different shapes.

It should be noted that different speckle lattices may have different shapes. For example, as shown in FIG. 4, the speckle lattice 401 is a rectangular speckle lattice, the speckle lattice 402 is a triangular speckle lattice, the speckle lattice 403 is an octagonal speckle lattice, and the speckle lattice 404 is another octagonal speckle lattice. Because the speckle lattice 401, the speckle lattice 402, the speckle lattice 403, and the speckle lattice 404 have different shapes, the speckle lattice 401, the speckle lattice 402, the speckle lattice 403, and the speckle lattice 404 are different speckle lattices.

In different speckle lattices, at least one of a quantity of speckles, a shape of a speckle, and a shape of a lattice is different. For example, although the speckle lattice 401 and the speckle lattice 408 shown in FIG. 4 have a same shape, the speckle lattice 401 and the speckle lattice 408 include different quantities of speckles (the speckle lattice 401 includes one more speckle than the speckle lattice 408). Therefore, the speckle lattice 401 and the speckle lattice 408 are different speckle lattices. For example, although the speckle lattice 401 and the speckle lattice 405 shown in FIG. 4 have a same shape and the speckle lattice 401 and the speckle lattice 405 each include a same quantity of speckles, a shape (circular) of a speckle in the speckle lattice 401 is different from a shape (rectangular) of a speckle in the speckle lattice 405. Therefore, the speckle lattice 401 and the speckle lattice 405 are different speckle lattices. For another example, although speckles included in the speckle lattice 402 and the speckle lattice 404 shown in FIG. 4 have a same shape and the two speckle lattices each include a same quantity of speckles, a shape (triangular) of the speckle lattice 402 is different from a shape (octagonal) of the speckle lattice 404. Therefore, the speckle lattice 402 and the speckle lattice 404 are different speckle lattices.

FIG. 4 is merely an example schematic diagram of an example of some speckle lattices. Speckle lattices in the plurality of light spots in the infrared light include but are not limited to the speckle lattices shown in FIG. 4.

Figure 5:
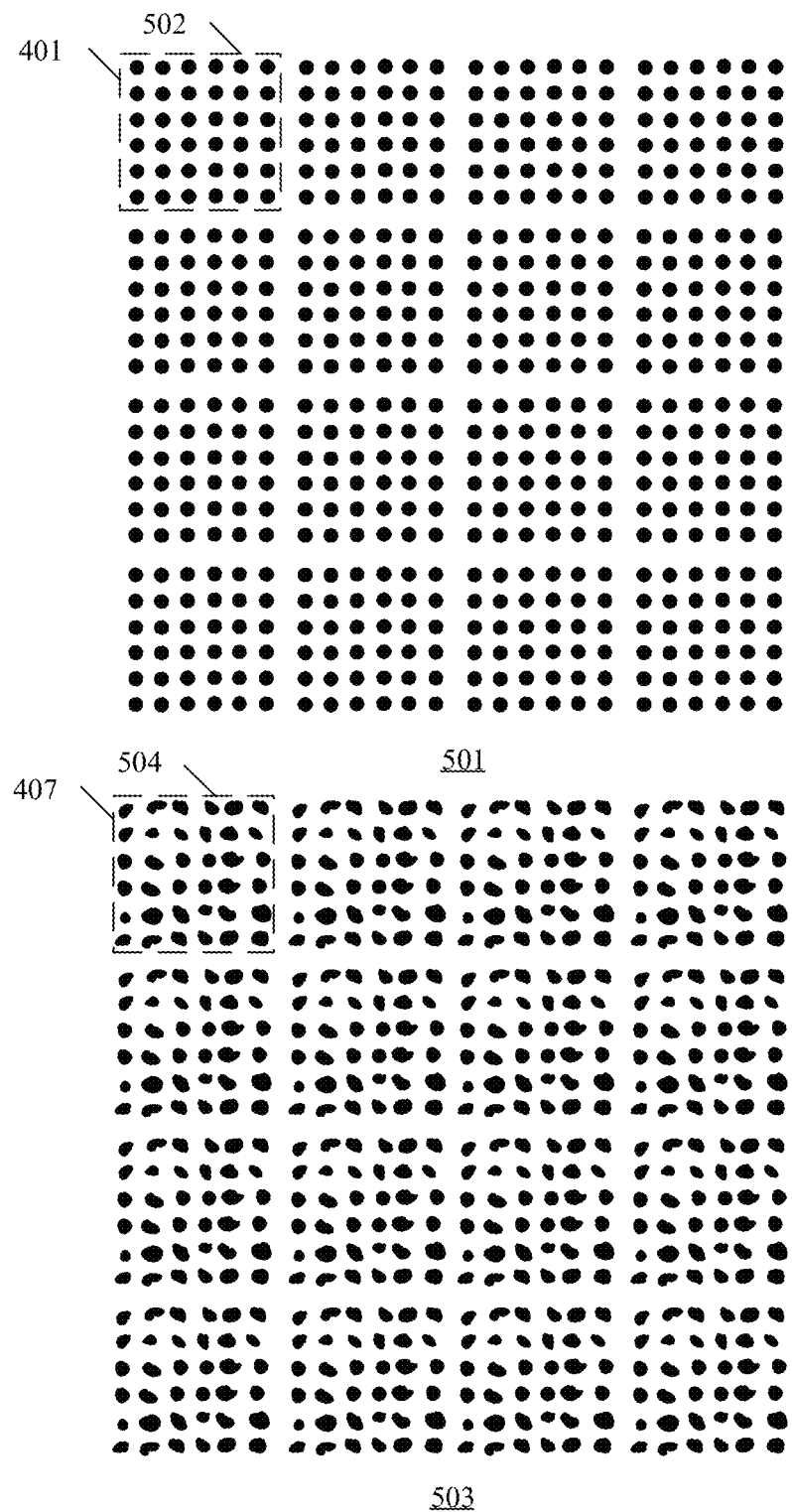
FIG. 5 is a schematic diagram 1 of an example of a speckle lattice group according to an embodiment of this application.

In some embodiments, the plurality of light spots include a plurality of same speckle lattice groups. Each speckle lattice group includes one speckle lattice. For example, it is assumed that the infrared light emitted by the infrared projector 101 has a plurality of light spots 501 shown in FIG. 5. 501 shown in FIG. 5 indicates the plurality of light spots. The plurality of light spots 501 include a plurality of same speckle lattice groups 502. The speckle lattice group 502 includes one speckle lattice 401. For another example, it is assumed that the infrared light emitted by the infrared projector 101 has a plurality of light spots 503 shown in FIG. 5. The plurality of light spots 503 include a plurality of same speckle lattice groups 504. The speckle lattice group 504 includes one speckle lattice 407.

In some other embodiments, the plurality of light spots include a plurality of same speckle lattice groups. Each speckle lattice group includes a plurality of speckle lattices. At least two of the plurality of speckle lattices are different.

Figure 6A:
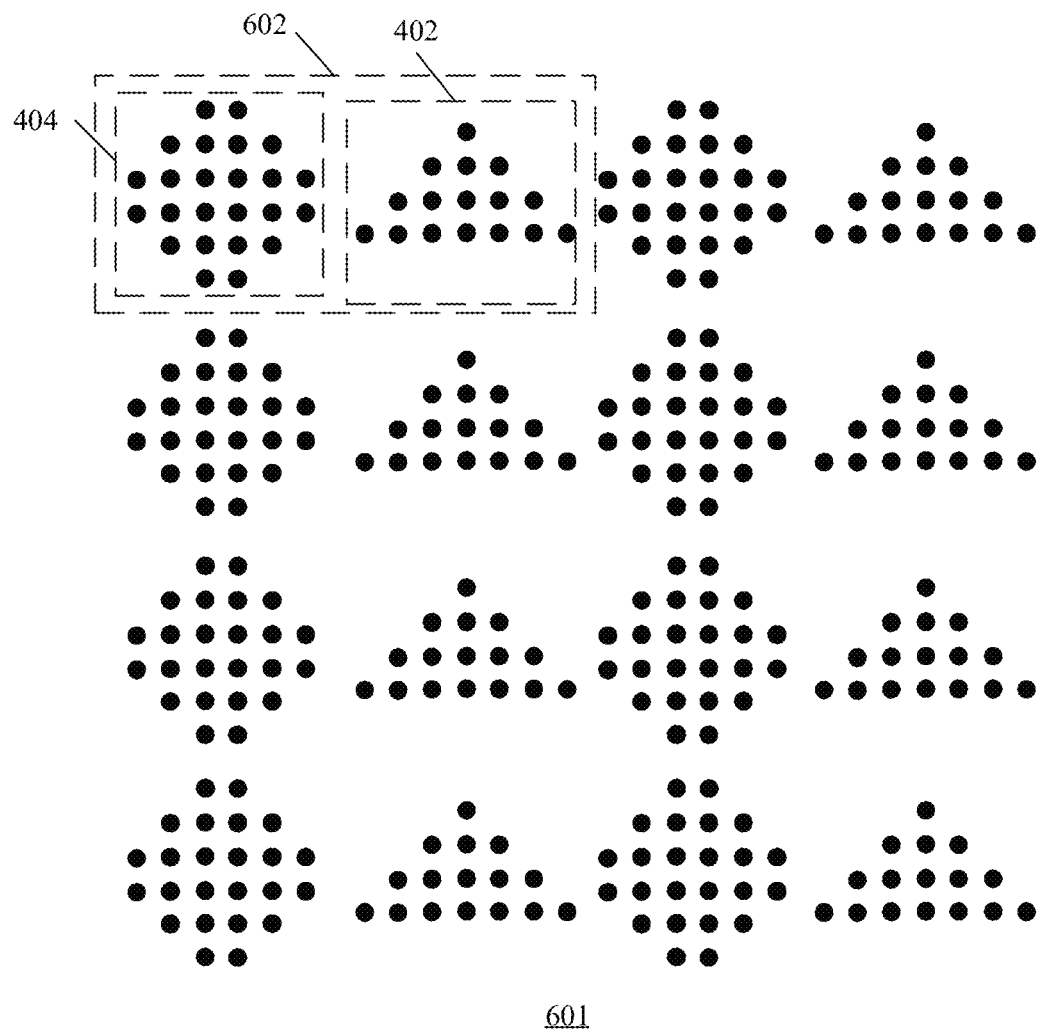
FIG. 6A is a schematic diagram 2 of an example of a speckle lattice group according to an embodiment of this application.

For example, it is assumed that the infrared light emitted by the infrared projector 101 has a plurality of light spots 601 shown in FIG. 6A. The plurality of light spots 601 include a plurality of same speckle lattice groups 602. The speckle lattice group 602 includes a speckle lattice 402 and a speckle lattice 404. The speckle lattice 402 is different from the speckle lattice 404.

Figure 6B:
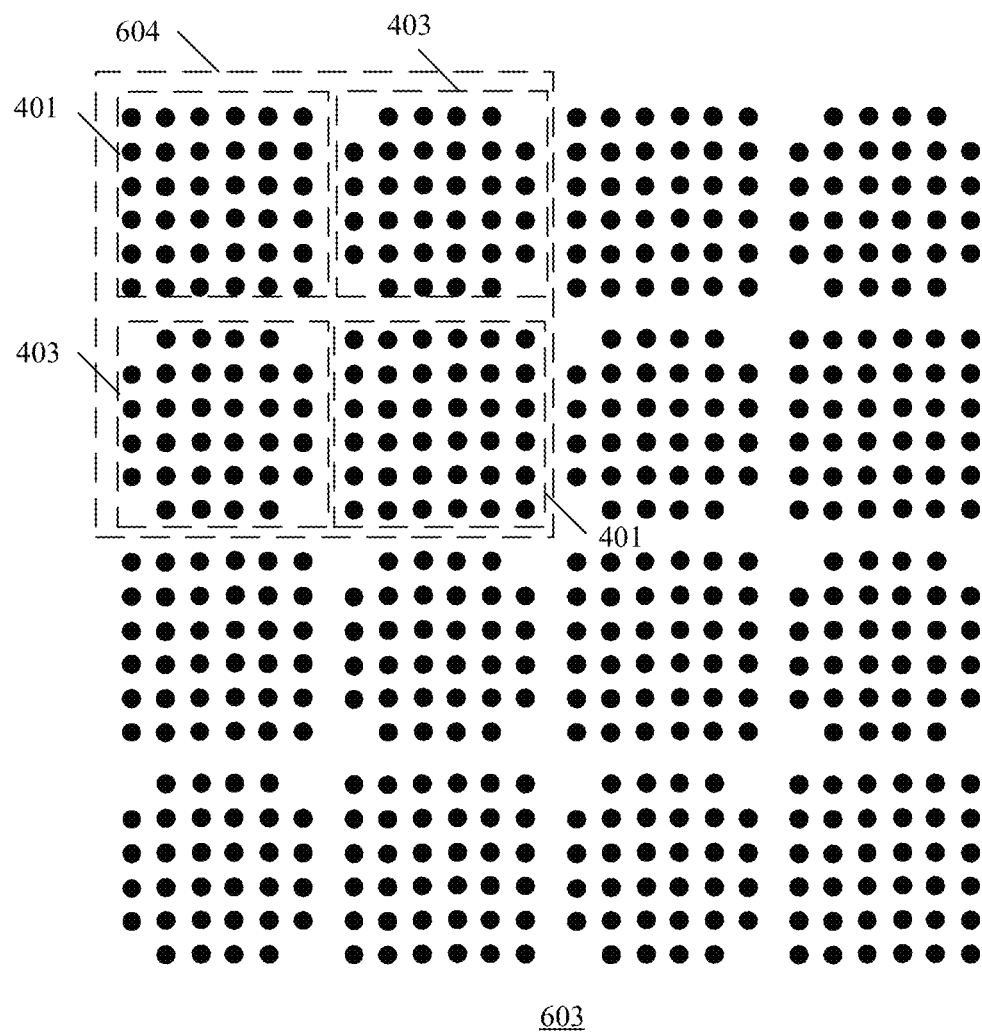
FIG. 6B is a schematic diagram 3 of an example of a speckle lattice group according to an embodiment of this application.

For another example, it is assumed that the infrared light emitted by the infrared projector 101 has a plurality of light spots 603 shown in FIG. 6B. The plurality of light spots 603 include a plurality of same speckle lattice groups 604. The speckle lattice group 604 includes two speckle lattices 401 and two speckle lattices 403. The speckle lattices 401 are different from the speckle lattices 403.

Figure 6C:
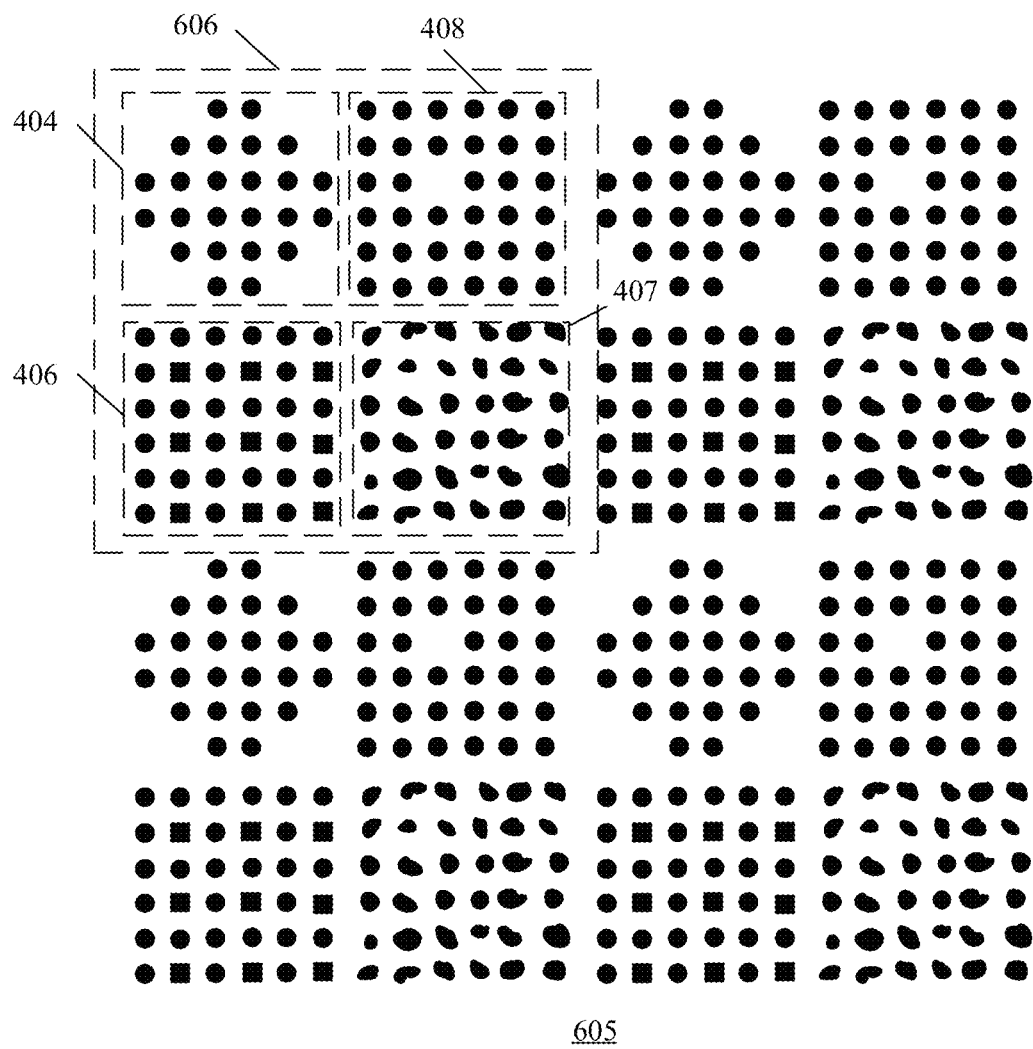
FIG. 6C is a schematic diagram 4 of an example of a speckle lattice group according to an embodiment of this application.

For another example, it is assumed that the infrared light emitted by the infrared projector 101 has a plurality of light spots 605 shown in FIG. 6C. The plurality of light spots 605 include a plurality of same speckle lattice groups 606. The speckle lattice group 606 includes a speckle lattice 404, a speckle lattice 408, a speckle lattice 406, and a speckle lattice 407. The speckle lattice 404, the speckle lattice 408, the speckle lattice 406, and the speckle lattice 407 are different from each other.

Figure 7A:
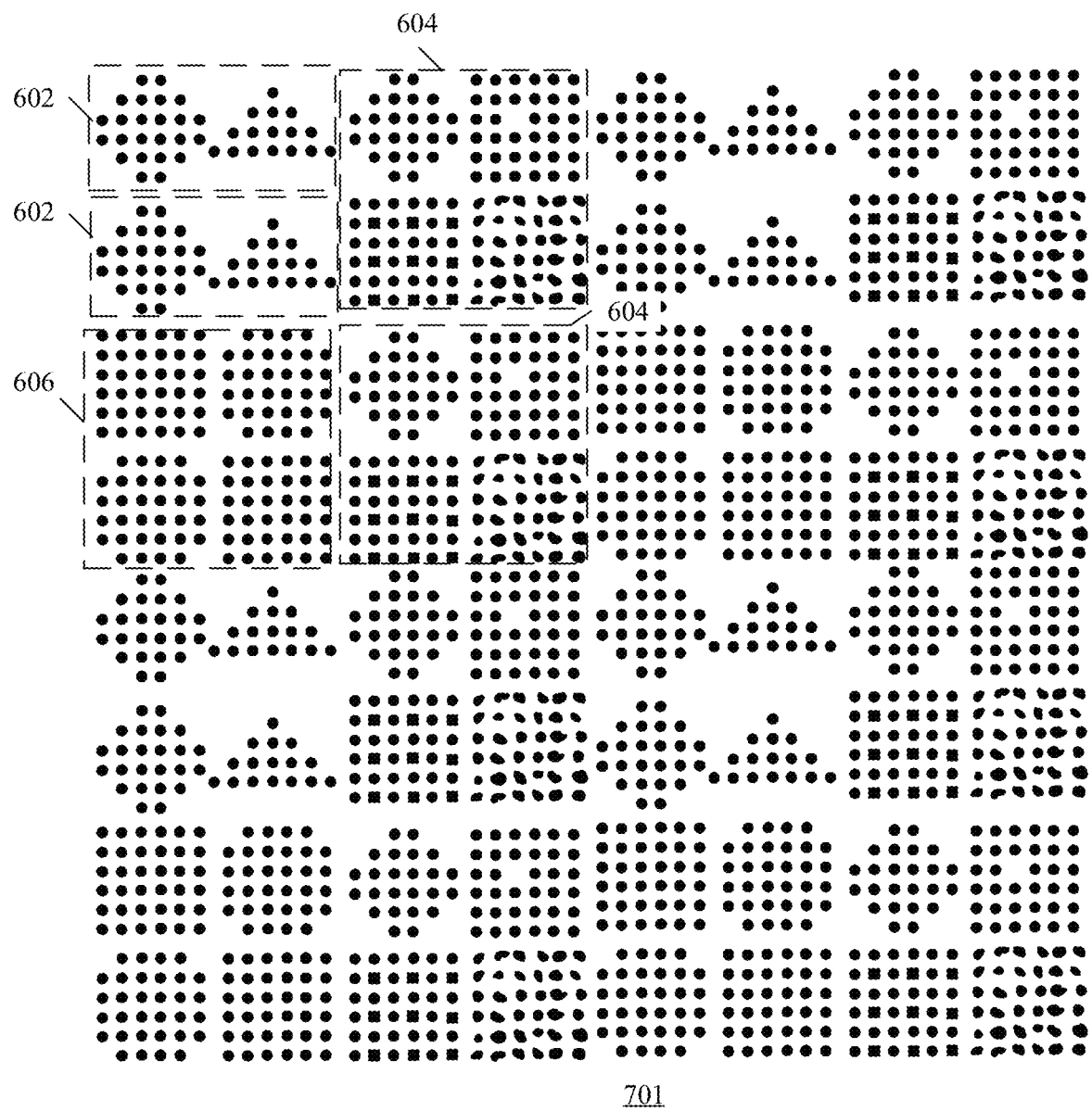
FIG. 7A is a schematic diagram 5 of an example of a speckle lattice group according to an embodiment of this application.

In some other embodiments, the plurality of light spots include a plurality of speckle lattice groups. The plurality of speckle lattice groups include at least two different speckle lattice groups. For example, it is assumed that the infrared light emitted by the infrared projector 101 has a plurality of light spots 701 shown in FIG. 7A. The plurality of light spots 701 include a plurality of different speckle lattice groups, for example, a speckle lattice group 602, a speckle lattice group 604, and a speckle lattice group 606.

Figure 7B:
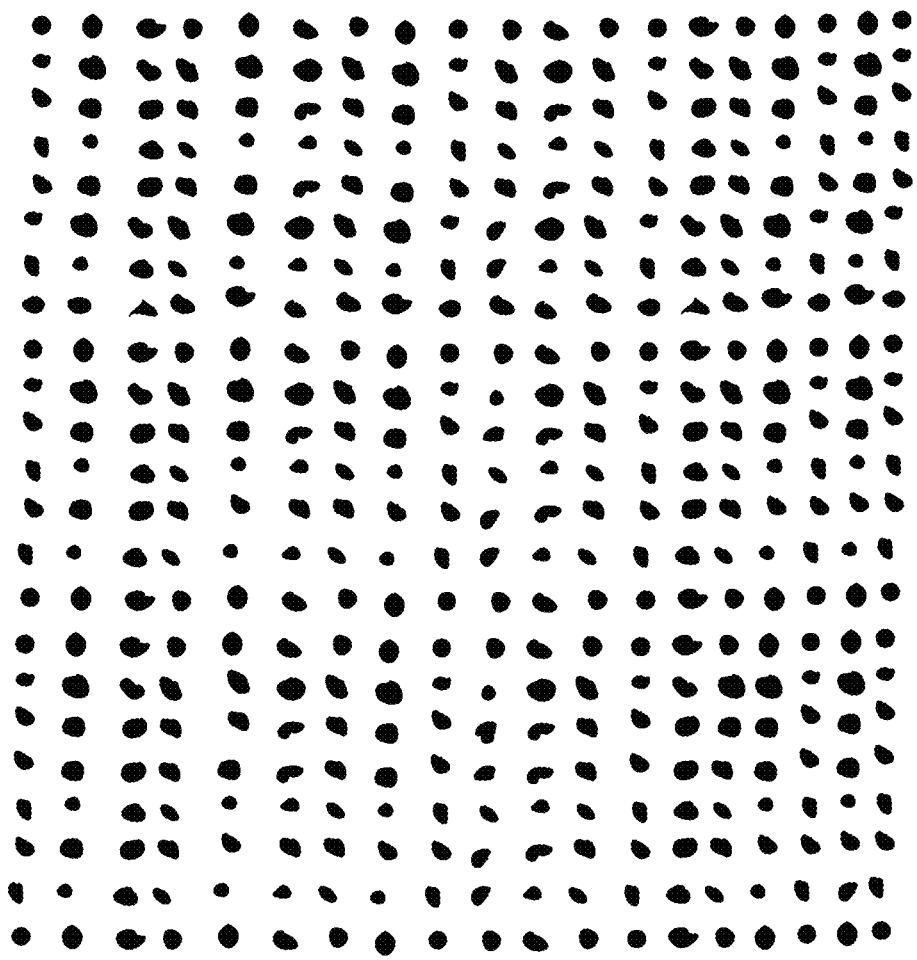
FIG. 7B is a schematic diagram 6 of an example of a speckle lattice group according to an embodiment of this application.

In some other embodiments, the plurality of light spots include a plurality of speckles of different shapes. The plurality of speckles of different shapes are randomly arranged. For example, as shown in FIG. 7B, a plurality of light spots 702 include a plurality of speckles of different shapes.

It should be noted that FIG. 5, FIG. 6A, FIG. 6B, FIG. 6C, or FIG. 7A is merely an example schematic diagram of an example of the plurality of light spots in the infrared light. A quantity of speckle lattices in the plurality of light spots in the infrared light is not limited to the quantity of speckle lattices shown in FIG. 5, FIG. 6A, FIG. 6B, FIG. 6C, or FIG. 7A.

Generally, a quantity of speckles in the infrared light emitted by the infrared projector 101 is approximately 3000. Certainly, a larger quantity of speckles in the infrared light emitted by the infrared projector 101 indicates a larger increase in a quantity of features of the target object when the infrared light is irradiated onto the target object, and more convenience for the electronic device 100 to calculate the depth information of the target object. For example, depth information of the target object that is calculated by the electronic device 100 when the quantity of speckles in the infrared light emitted by the infrared projector 101 is approximately 7000 is more accurate than depth information of the target object that is calculated by the electronic device 100 when the quantity of speckles is approximately 3000.

It can be understood that, when speckle lattice groups in the infrared light emitted by the infrared projector 101 are periodically repeated, texture features formed when the infrared light is irradiated onto the target object are also repeated. In this embodiment of this application, repetition frequency of speckle lattices may be represented by a quantity of same speckle lattices that appear in a preset area. A larger quantity of same speckle lattice groups that appear in the preset area indicates higher repetition frequency of speckle lattices and a smaller repetition interval of the speckle lattices. In this case, a feature matching error easily occurs when the electronic device 100 identifies a same feature in the image information collected by the first camera 102 and the image information collected by the second camera 103. In this embodiment of this application, feature matching means identifying a same feature in the image information collected by the first camera 102 and the image information collected by the second camera 103. A smaller quantity of same speckle lattice groups that appear in the preset area indicates lower repetition frequency of speckle lattices and a larger repetition interval of the speckle lattices.

Figure 7C:
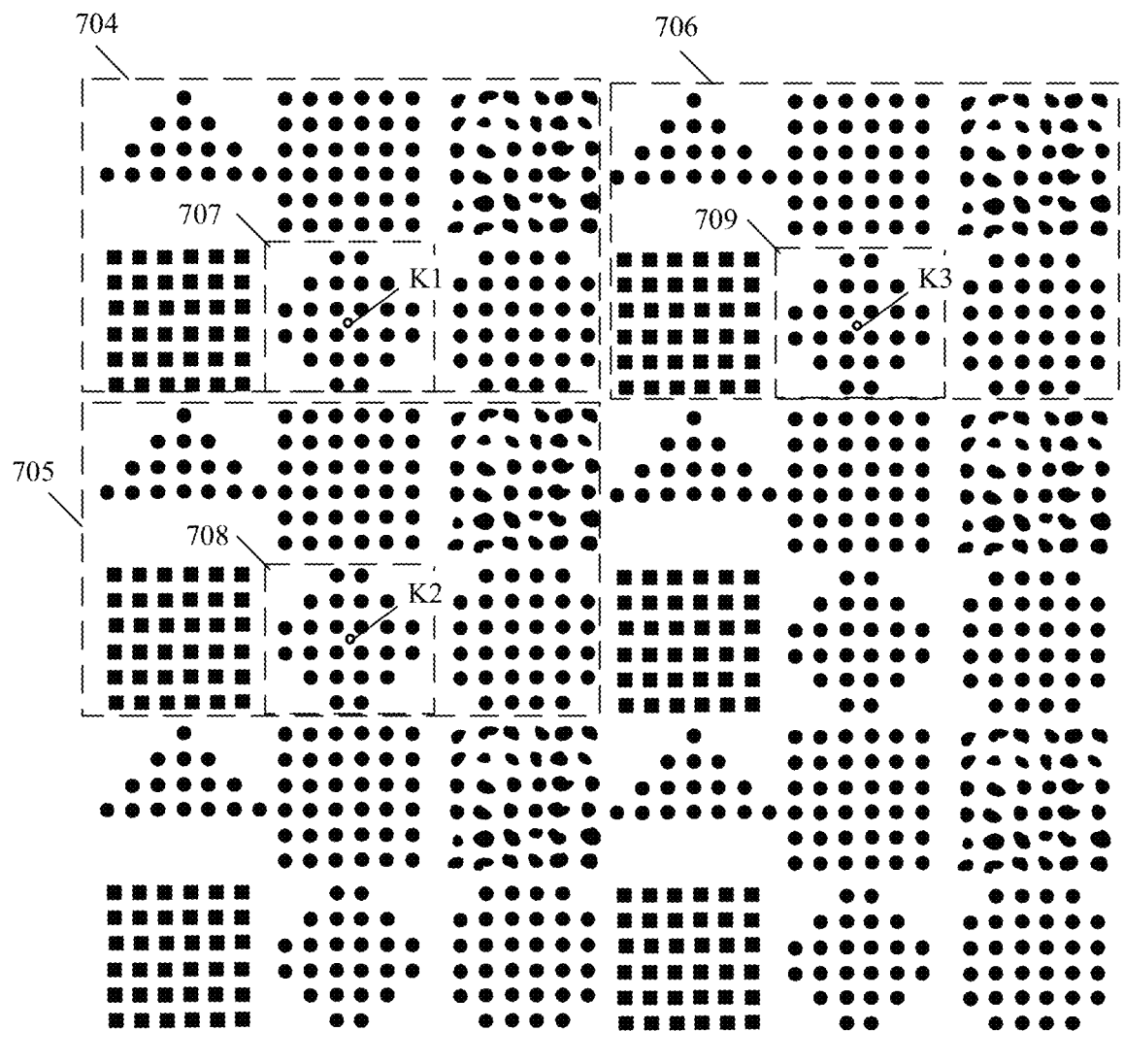
FIG. 7C is a schematic diagram 7 of an example of a speckle lattice group according to an embodiment of this application.

The repetition interval, reflected on an image, of speckle lattices is a shortest distance between two same speckle lattices. For example, a distance between two speckle lattices may be a distance between center points of the two speckle lattices. For example, as shown in FIG. 7C, a plurality of light spots 703 includes a plurality of repeated speckle lattice groups, for example, a speckle lattice group 704, a speckle lattice group 705, and a speckle lattice group 706. The speckle lattice group 704, the speckle lattice group 705, and the speckle lattice group 706 are the same. A point K1 is a center point of a speckle lattice 707 in the speckle lattice group 704. A point K2 is a center point of a speckle lattice 708 in the speckle lattice group 705. A point K3 is a center point of a speckle lattice 709 in the speckle lattice group 706. A repetition interval of speckle lattices shown in FIG. 7C may be represented by a shortest distance of a distance between the point K1 and the point K2 and a distance between the point K1 and the point K3. Because the distance between the point K1 and the point K2 is shorter than the distance between the point K1 and the point K3, the repetition interval of the speckle lattices shown in FIG. 7C may be represented by the distance between the point K1 and the point K2.

In this embodiment of this application, lower repetition frequency of speckle lattices indicates lower repetition of texture features formed when the infrared light is irradiated onto the target object, and higher accuracy of the depth information of the target object that is calculated by the electronic device 100.

The electronic device 100 calculates the depth information of the target object according to a triangulation principle by using a formula $$Z = \frac{f \times T}{d}.$$

To be specific, the depth information of the target object is calculated based on a distance (that is, a first length T) between the first camera 102 and the second camera 103, a lens focal length f of the first camera 102 and the second camera 103, and a parallax d.

To ensure that the infrared light with the light spot that is emitted by the infrared projector 101 may be irradiated onto the target object, and the target object onto which the infrared light with the light spot is irradiated can be photographed by the first camera 102 and the second camera 103, in this embodiment of this application, a coverage area of a field of view (field of view, FOV) of the infrared projector 101, a coverage area of an FOV of the first camera 102, and a coverage area of an FOV of the second camera 103 partially or completely overlap. A size of an FOV may represent a field of vision of an optical device (for example, a camera).

A larger overlapping region of the coverage areas of the FOVs of the infrared projector 101, the first camera 102, and the second camera 103 indicates a larger quantity of texture features collected by the first camera 102 and the second camera 103. To make an overlapping region of the coverage areas of the FOVs of the infrared projector 101, the first camera 102, and the second camera 103 comparatively large, as shown in FIG. 1A, the infrared projector 101 may be disposed between the first camera 102 and the second camera 103.

It can be understood that the distance (that is, the first length) between the first camera 102 and the second camera 103 also affects a size of the overlapping region. For example, a larger first length indicates a smaller overlapping region of the coverage areas of the FOVs of the first camera 102 and the second camera 103. However, if the first length is excessively small, a parallax between the first camera 102 and the second camera 103 for each feature of the target object is also very small, and is close to zero. Therefore, the first length cannot be excessively large or excessively small. If the first length is excessively large or excessively small, accuracy of the depth information calculated by the electronic device 100 is affected.

It is learned from an experiment that when the first length T is any length ranging from 20 mm to 30 mm, the depth information calculated by the electronic device 100 is comparatively accurate. Therefore, in this embodiment of this application, the first length T may be any length ranging from 20 mm to 30 mm. For example, the first length T may be 29.5 mm. It should be noted that how to set the distance between the two cameras may be affected by a camera parameter. Therefore, that the first length T is 20 mm to 30 mm is merely an example.

After the infrared projector 101 emits the infrared light with the light spot, if the first camera 102 and the second camera 103 are required to be able to collect image information including the light spot, the first camera 102 and the second camera 103 are required to be able to receive the infrared light. For example, the first camera 102 and the second camera 103 may be configured to receive infrared light of 890 nm to 990 nm, for example, infrared light of 940 nm.

It can be learned from the foregoing descriptions that, in this embodiment of this application, the first camera 102 and the second camera 103 are required to be able to sense infrared light (that is, receive infrared light). However, a common RGB camera can sense only visible light, but cannot sense infrared light. Whereas, costs of disposing an infrared camera with an infrared light sensing function in the electronic device 100 are comparatively high, and use of the infrared camera increases power consumption of the electronic device 100.

To reduce hardware costs of the electronic device 100 and reduce power consumption of the electronic device 100, in this embodiment of this application, a common RGB camera may be improved to obtain the first camera 102 and the second camera 103 that can sense infrared light.

Figure 8:
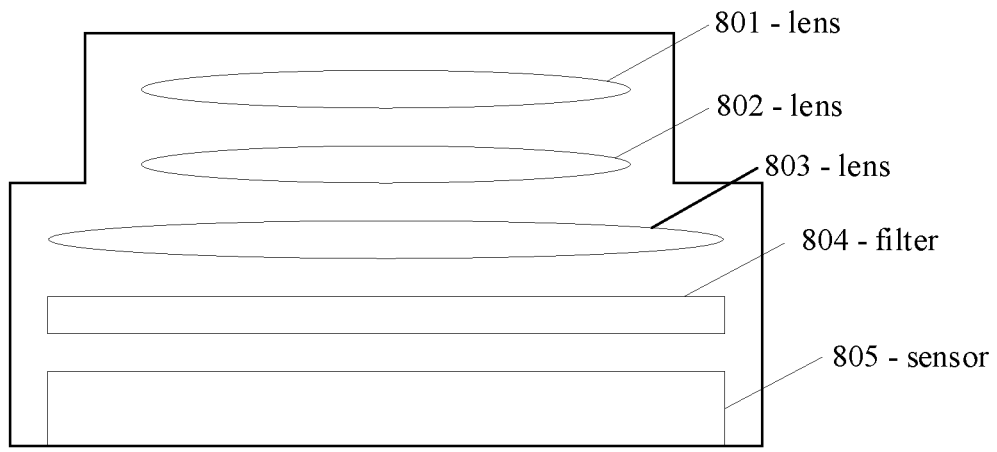
FIG. 8 is a schematic structural diagram of a camera module according to an embodiment of this application.
Figure 8:
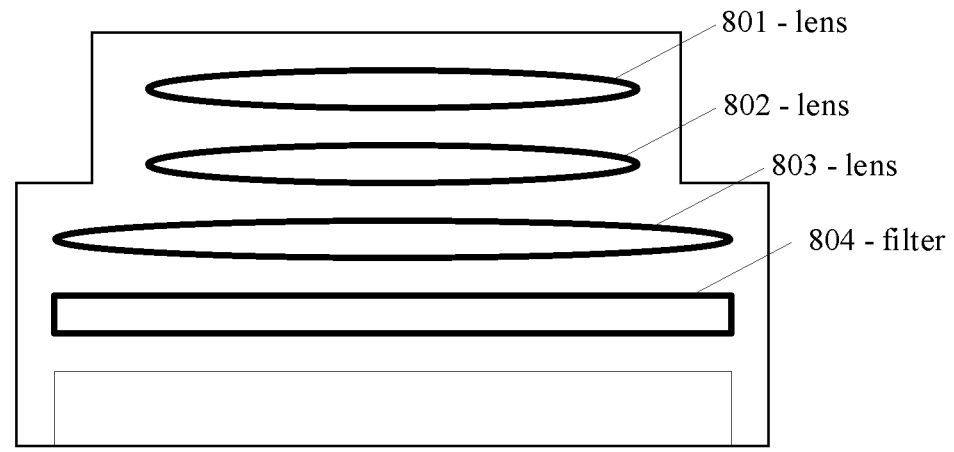

Referring to FIG. 8(a) it is a schematic structural diagram of a common RGB camera module according to an embodiment of this application. As shown in (a) in FIG. 8, in this embodiment of this application, a rolling shutter camera is used as an example to describe a manner of improving a common RGB camera to obtain the first camera 102 and the second camera 103 in this embodiment of this application.

As shown in (a) in FIG. 8, an RGB camera module 800 may include a 3P lens, a light filter (also referred to as a filter) 804, and a sensor (sensor) 805. The 3P lens means that the RGB camera includes three lenses: a lens 801, a lens 802, and a lens 803. The sensor 805 may be a 2 M sensor. 2 M means that a highest resolution of the RGB camera can reach 2 megapixels.

To enable the RGB camera module 800 shown in (a) in FIG. 8 to sense both visible light and infrared light, the RGB camera module 800 shown in (a) in FIG. 8 may be improved as follows: An antireflection coating is plated on each of two sides of each lens (for example, the lens 801, the lens 802, and the lens 803) of the RGB camera module 800 shown in (a) in FIG. 8, to obtain a lens 801, a lens 802, and a lens 803 shown in (b) in FIG. 8. A cut-off coating is plated on the light filter 804, to obtain a light filter 804 shown in (b) in FIG. 8. In this embodiment of this application, the sensor 805 in the RGB camera module 800 may not be improved. In this embodiment of this application, a cut-off coating may be plated on each of two sides of the light filter 804; or a cut-off coating may be plated on one side of the light filter 804.

It should be noted that, to enable the first camera 102 and the second camera 103 to sense the infrared light emitted by the infrared projector 101, the first camera 102 and the second camera 103 need to have a capability of sensing the infrared light emitted by the infrared projector 101. Therefore, the antireflection coating may be an antireflection coating corresponding to a wavelength of the infrared light emitted by the infrared projector 101. For example, the antireflection coating may be an antireflection coating for infrared light of 890 nm to 990 nm, for example, an antireflection coating for infrared light of 940 nm.

The antireflection coating is plated on each of the two sides of each lens (for example, the lens 801, the lens 802, and the lens 803), so that the capability of the lens 801, the lens 802, and the lens 803 to sense the infrared light emitted by the infrared projector 101 can be improved, and the lens 801, the lens 802, and the lens 803 can receive, as much as possible, the infrared light emitted by the infrared projector 101.

The cut-off coating may be used to filter out light other than the infrared light emitted by the infrared projector 101 and visible light, and increase a transmittance of the infrared light.

For example, the cut-off coating may be used to filter out infrared light with a wavelength of 850 nm. It can be understood that, because the infrared light with the wavelength of 850 nm has an obvious red light feature, a severe red exposure phenomenon may occur. Therefore, the cut-off coating is used to filter out the infrared light with the wavelength of 850 nm, so that a possibility of occurrence of a red exposure phenomenon can be reduced. The red exposure phenomenon is a problem of unclean light filtering. For example, sometimes, only infrared light (that is, an infrared ray) may be expected to be used for lighting, and therefore a filter may be added to a light source to filter out light other than the infrared ray. In this case, a small amount of infrared light may still be visible to human eyes due to unclean light filtering. This phenomenon is referred to as the red exposure phenomenon.

In this embodiment of this application, the common RGB camera to be improved includes but is not limited to the foregoing rolling shutter camera. A reason for improving the rolling shutter camera to obtain the foregoing first camera is that exposure of the rolling shutter camera is performed line by line, and costs are comparatively low. In this embodiment of this application, the rolling shutter camera is improved to obtain the first camera 102 and the second camera 103, so that costs can be further reduced.

S203. The electronic device 100 calculates the depth information of the target object based on the first image information, the second image information, the first length, and the lens focal length.

It can be learned from the foregoing formula $$Z = \frac{f \times T}{d}$$

that a depth Z of a point at which each feature of the target object is located is inversely proportional to a parallax d between the first camera 102 and the second camera 103 for the point, the depth Z of the point at which each feature is located is directly proportional to the lens focal length f, and the depth Z of the point at which each feature is located is directly proportional to the first length T.

The first length T and the lens focal length f are hardware parameters of the first camera 102 and the second camera 103. The first length T and the lens focal length f are fixed. In this case, a value of the depth Z of each point of the target object depends on a value of the parallax d between the first camera 102 and the second camera 103 for the point.

Figure 10A:
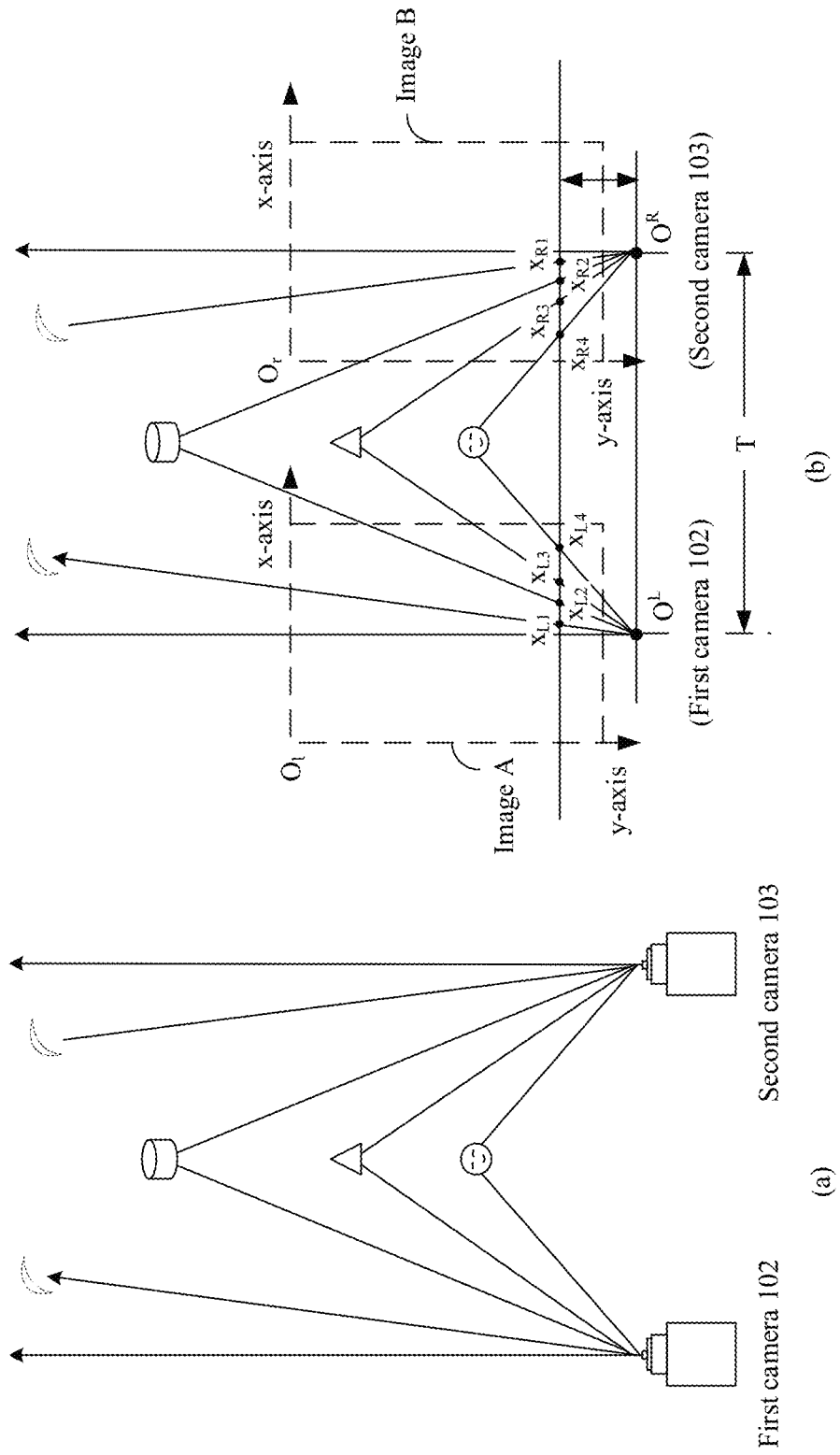
FIG. 10A is a schematic diagram 2 of a principle of calculating depth information according to an embodiment of this application.

For example, as shown in (a) in FIG. 10A, it is assumed that the first camera 102 is a left-side dual-pass camera, and the second camera 103 is a right-side dual-pass camera. A smiling face, a triangle, a cylinder, and a crescent moon separately represent different features of the target object. Distances from locations of the smiling face, the triangle, the cylinder, and the crescent moon to the cameras gradually increase. As shown in (b) in FIG. 10A, $O^L$ is a location of the first camera 102, $O^R$ is a location of the second camera 103, and a distance between $O^L$ and $O^R$ is T that is, the first length).

As shown in (b) in FIG. 10A, the first camera 102 collects an image A, and the second camera 103 collects an image B. A coordinate of the crescent moon on an x-axis of a coordinate system with Oi (an upper left corner of the image A) as an origin (which is referred to as a coordinate system L for short) is $x_{L1}$, a coordinate of the cylinder on the x-axis of the coordinate system L is $x_{L2}$, a coordinate of the triangle on the x-axis of the coordinate system L is $x_{L3}$, and a coordinate of the smiling face on the x-axis of the coordinate system L is $x_{L4}$. A coordinate of the crescent moon on an x-axis of a coordinate system with $O_r$ (an upper left corner of the image B) as an origin (which is referred to as a coordinate system R for short) is $x_{R1}$, a coordinate of the cylinder on the x-axis of the coordinate system R is $x_{R2}$, a coordinate of the triangle on the x-axis of the coordinate system R is $x_{R3}$, and a coordinate of the smiling face on the x-axis of the coordinate system R is $x_{R4}$.

A parallax between the first camera 102 and the second camera 103 for the crescent moon is d1, and $d=x_{L1}-x_{R1}$. A parallax between the first camera 102 and the second camera 103 for the cylinder is d2, and $d2=x_{L2}-x_{R2}$. A parallax between the first camera 102 and the second camera 103 for the triangle is d3, and $d3=x_{L3}-x_{R3}$. A parallax between the first camera 102 and the second camera 103 for the smiling face is d4, and $d4=x_{L4}-x_{R4}$.

In this embodiment of this application, the smiling face shown in (b) in FIG. 10A is used as an example herein to describe the parallax d4 ($d4=x_{L4}-x_{R4}$) between the first camera 102 and the second camera 103 for the smiling face.

Figure 10B:
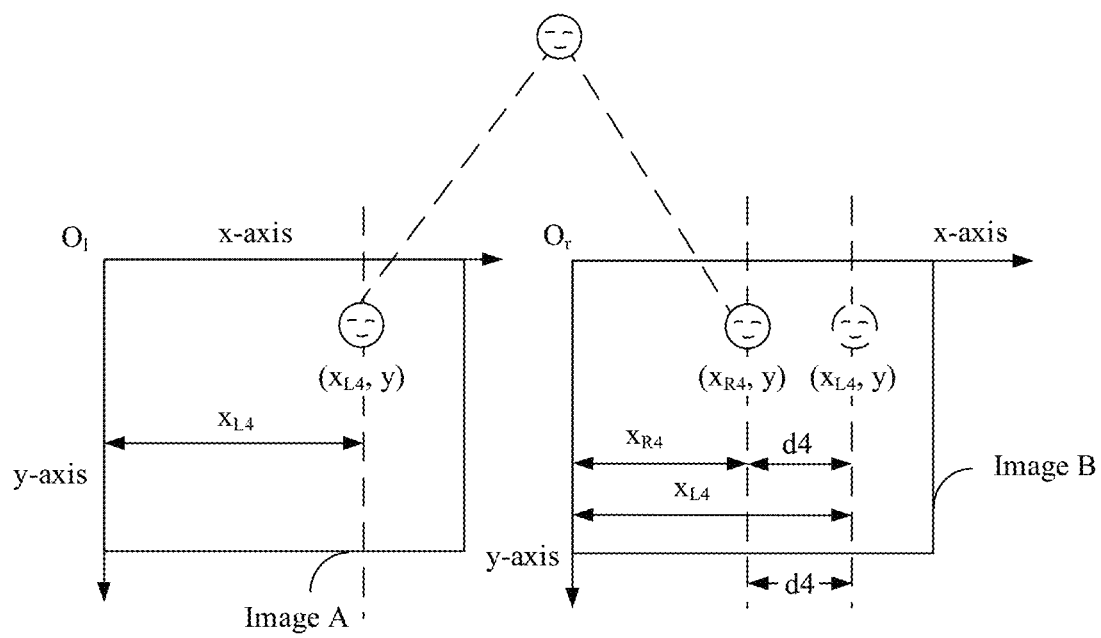
FIG. 10B is a schematic diagram of a principle of calculating a parallax according to an embodiment of this application.
Figure 10C:
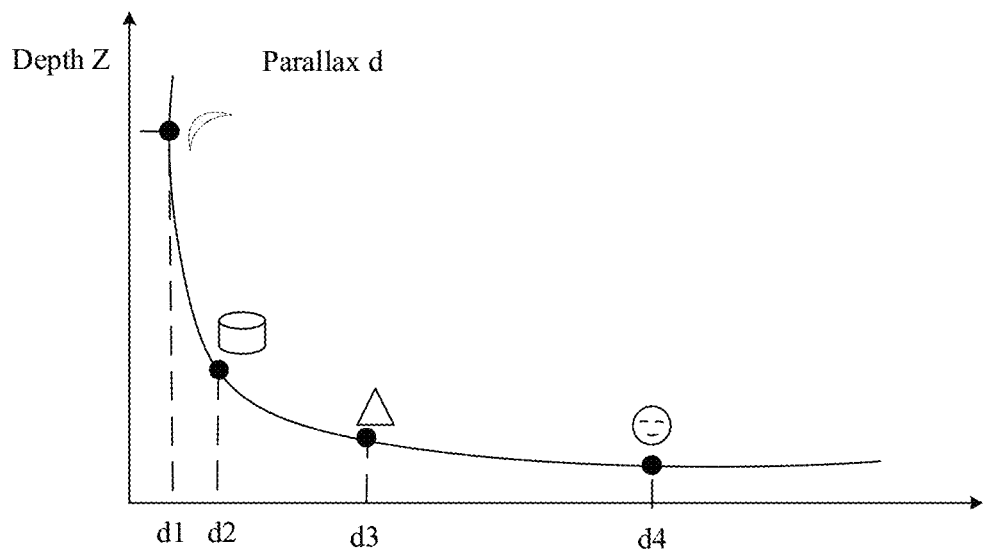
FIG. 10C is a schematic diagram of a relationship between a parallax and a depth according to an embodiment of this application.

As shown in FIG. 10B, coordinates of the smiling face collected by the first camera 102 in a coordinate system of the image A are $(x_{L4}, y)$, and coordinates of the smiling face collected by the second camera 103 in a coordinate system of the image B are $(x_{R4}, y)$. As shown in FIG. 10B, a difference between the coordinates $(x_{L4}, y)$ and the coordinates $(x_{R4}, y)$ on an x-axis is d4, where $d4=x_{L4}-x_{R4}$, that is, the parallax d4 between the first camera 102 and the second camera 103 for the smiling face is equal to $x_{L4}-x_{R4}$.

d1<d2<d3<d4. The depth Z of each feature (that is, the point at which the feature is located) of the target object is inversely proportional to the parallax d between the first camera 102 and the second camera 103 for the point. Therefore, a schematic diagram of a relationship between the parallax d and the depth Z may be obtained, as shown in FIG. 10C. As shown in FIG. 10C, as the parallax d gradually increases, the depth Z gradually decreases.

Figure 9:
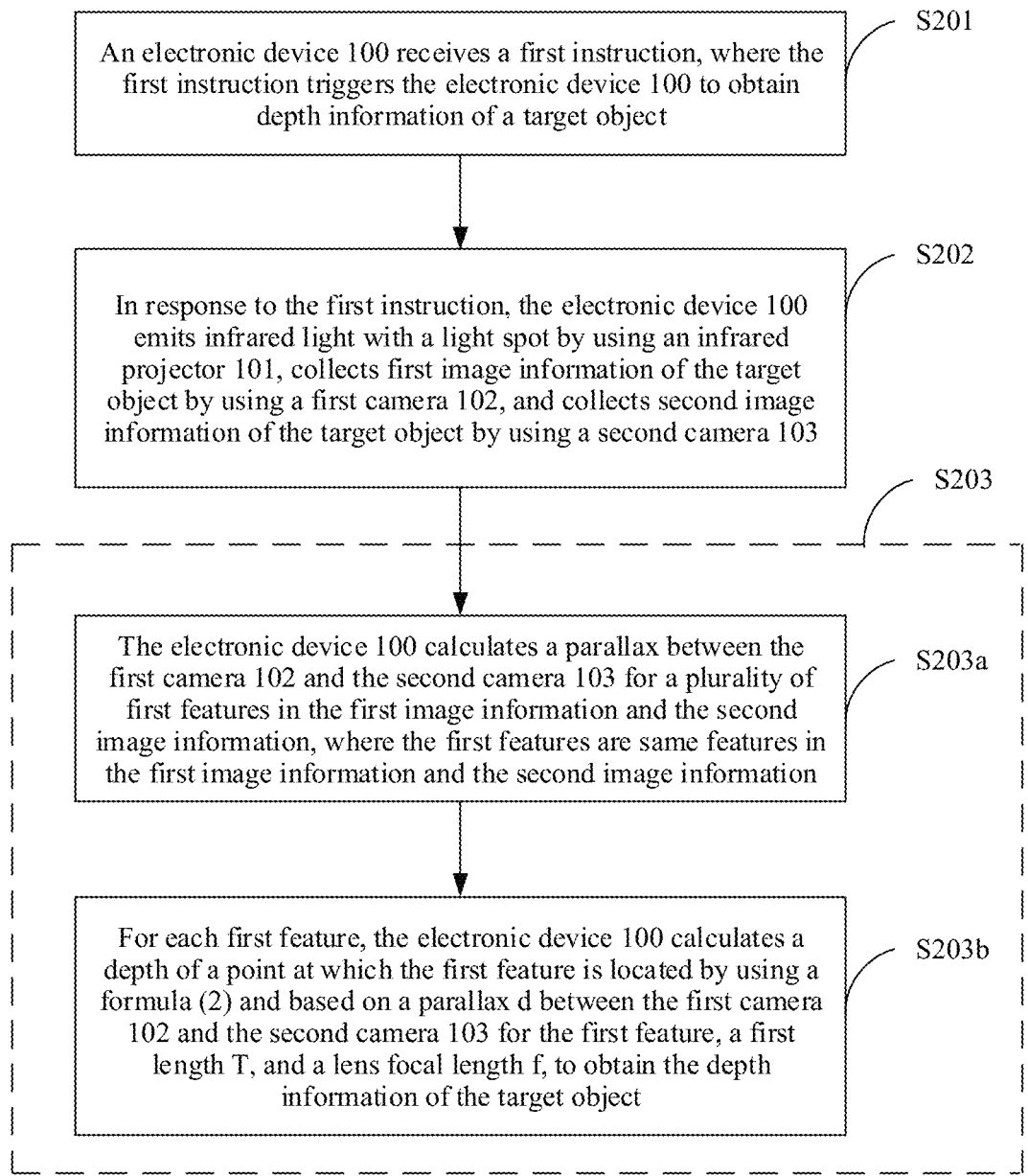
FIG. 9 is a flowchart 2 of a method for obtaining depth information according to an embodiment of this application.

To sum up, the electronic device 100 may first calculate a parallax d between the first camera 102 and the second camera 103 for a feature of the target object; then calculate a depth Z of a point at which the feature is located based on the parallax d of the feature, the first length T, and the lens focal length f; and then obtain the depth information of the target object based on depths of a plurality of points. Specifically, as shown in FIG. 9, S203 shown in FIG. 2 may include S203a and S203b.

S203a. The electronic device 100 calculates a parallax between the first camera 102 and the second camera 103 for a plurality of first features in the first image information and the second image information, where the first features are same features in the first image information and the second image information.

Figure 11:
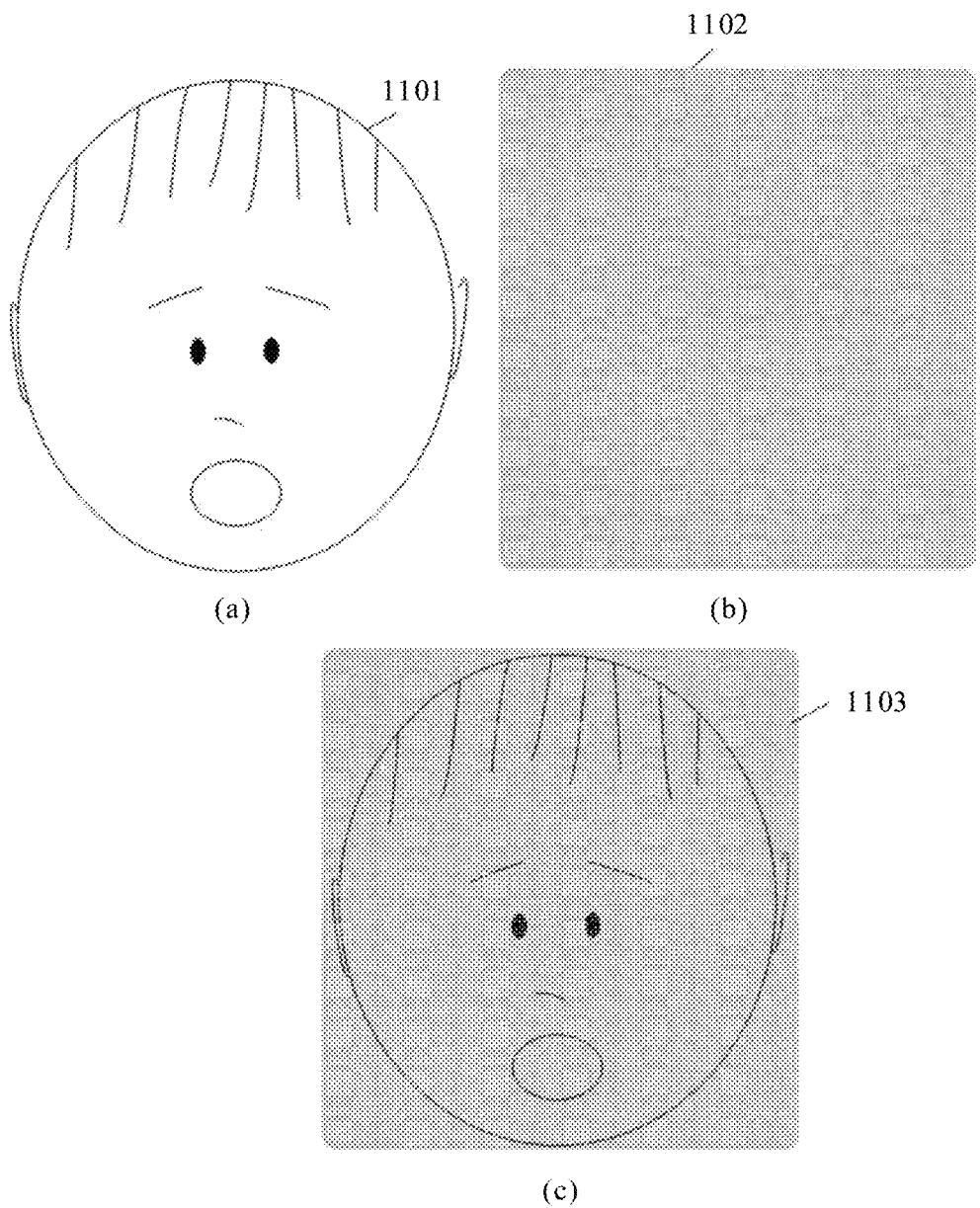
FIG. 11 is a schematic diagram of an example of a target object and infrared light with a light spot according to an embodiment of this application.

A quantity of texture features of the target object may be increased when the infrared light with the light spot that is emitted by the infrared projector 101 is irradiated onto the target object. For example, it is assumed that the target object is a human face 1101 shown in (a) in FIG. 11, and infrared light 1102 shown in (b) in FIG. 11 that is emitted by the infrared projector 101 includes a light spot shown in FIG. 7C. After the infrared light 1102 emitted by infrared projector 101 is irradiated onto the human face 1101, a human face 1103 onto which the light spot is irradiated may be obtained, as shown in (c) in FIG. 11. Compared with the human face 1101, the human face 1103 onto which the light spot is irradiated has more feature textures.

A difference lies in that, points at which same features in image information of the human face 1103 collected by the first camera 102 (that is, the first image information) and image information of the human face 1103 collected by the second camera 103 (that is, the second image information) are located are at different locations on an x-axis of a coordinate system, that is, the first camera 102 and the second camera 103 have a parallax.

The electronic device 100 may identify the first image information collected by the first camera 102 and the second image information collected by the second camera 103, and determine a same feature in the first image information and the second image information. The same feature in the first image information and the second image information may include a feature of the target object itself and a texture feature formed when the infrared light with the light spot is irradiated onto the target object. To be specific, in this embodiment of this application, when identifying the same feature in the first image information and the second image information, the electronic device 100 not only can identify a same feature of the target object in the first image information and the second image information, but also can identify a same feature that is in the first image information and the second image information and that is among texture features formed when the infrared light with the light spot is irradiated onto the target object. That is, when identifying the same feature in the two pieces of image information, the electronic device 100 may perform determining based on the feature of the target object or the texture feature, or may perform determining by combining the two features. For example, if determining can be performed based on the feature of the target object or the texture feature alone, the two features do not need to be combined; or when it is difficult or impossible to determine, based on the feature of the target object, whether a feature is a same feature, whether the feature is a same feature may be determined based on both the texture feature and the feature of the target object.

For example, when visible light is comparatively strong in the daytime, the texture feature formed when the infrared light with the light spot is irradiated onto the target object is almost invisible in the image information collected by the first camera 102 and the second camera 103. However, because the visible light is comparatively strong, the feature of the target object is comparatively obvious when the visible light is irradiated onto the target object. In this case, when identifying the same feature in the two pieces of image information, the electronic device 100 may perform determining based on the feature of the target object.

It should be noted that, although speckles in the foregoing speckle lattice may have a same shape (for example, the speckle lattice includes a plurality of dots), locations of the speckles in the speckle lattice are different. Therefore, the electronic device 100 may identify, based on the speckle lattice and the locations of the speckles in the speckle lattice, a same feature represented by speckles of a same shape in the first image information and the second image information.

In some embodiments, the plurality of first features include all same features in the first image information and the second image information. The electronic device 100 may identify all the same features in the first image information and the second image information, and then perform S203*b* for each feature to calculate a depth of the feature, to obtain the depth information of the target object.

In some other embodiments, the plurality of first features are some of same features in the first image information and the second image information. In this embodiment, the electronic device 100 may select a plurality of first features from the first image information based on preset feature frequency, then search the second image information for a feature that is the same as the plurality of first features, and finally perform S203*b* for each first feature to calculate a depth of the first feature, to obtain the depth information of the target object. Alternatively, the electronic device 100 may select some first features from the first image information randomly or at an interval.

The feature frequency may be a quantity of same first features that appear in a preset area. The feature frequency, reflected on an image, may be a distance (referred to as a feature distance) between two adjacent first features selected by the electronic device 100. A method for selecting, by the electronic device 100, the plurality of first features from the first image information based on the preset feature frequency may include: The electronic device 100 selects one first feature from all features in the first image information at an interval of one feature distance.

In other words, the electronic device 100 does not need to calculate a depth of a point at which each of same features in the first image information and the second image information is located, but selects one feature at an interval of one feature distance, and calculates a depth of a point at which the selected feature is located.

For example, in this embodiment of this application, the foregoing periodic feature is described herein by using the texture feature that is in the first image information and the second image information and that is formed when the infrared light with the light spot is irradiated onto the target object as an example.

Figure 12:
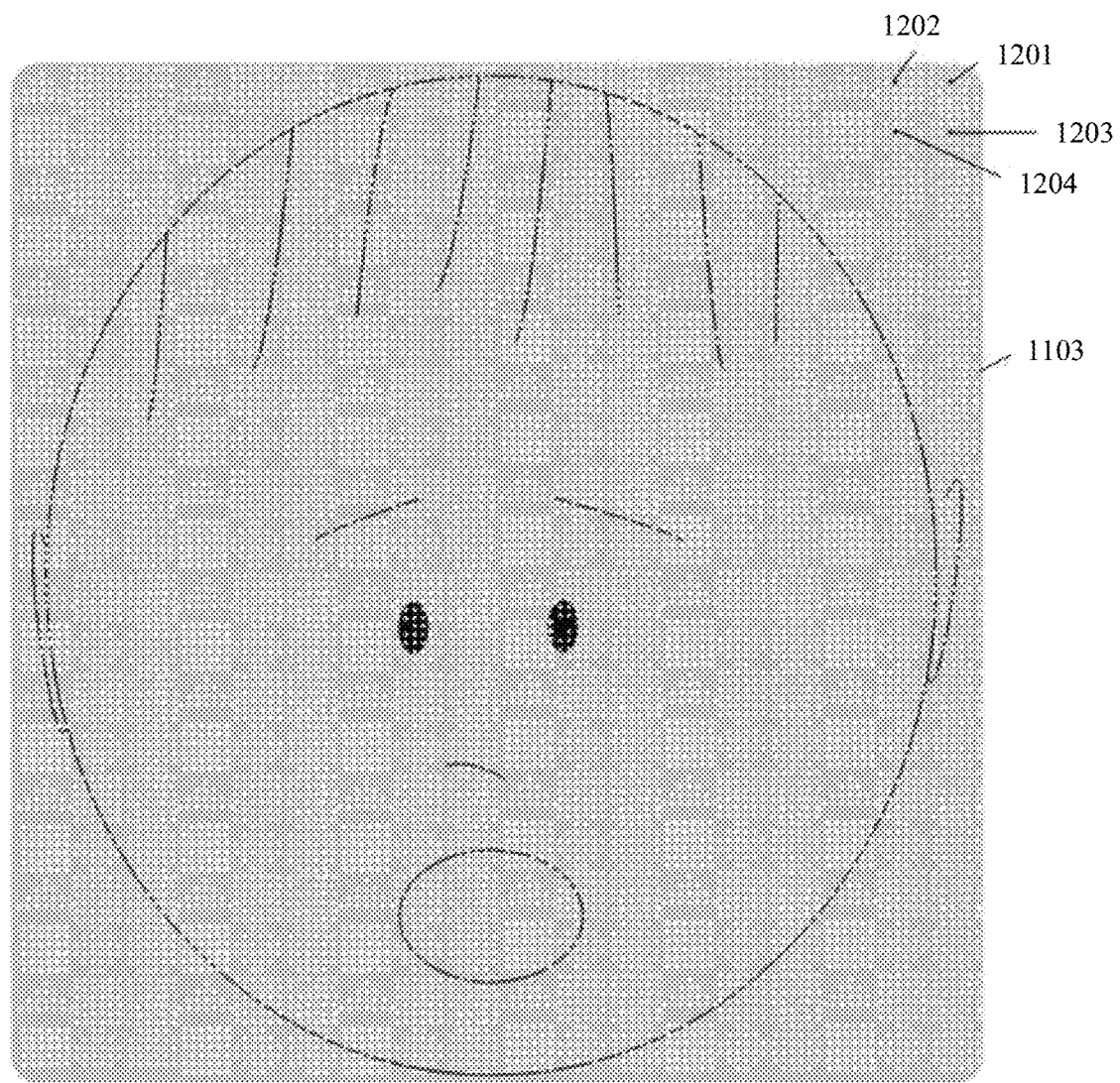
FIG. 12 is a schematic diagram of an example of feature frequency according to an embodiment of this application.

As shown in FIG. 12, the feature distance may be a distance between a speckle 1201 and a speckle 1202, or a distance between the speckle 1202 and a speckle 1204, or a distance between the speckle 1204 and a speckle 1203, or a distance between the speckle 1201 and the speckle 1203. As shown in FIG. 12, in this embodiment of this application, a manner of marking speckles black is used to show some first features in texture features formed when the infrared light with the light spot is irradiated onto the target object. In other words, speckles marked black shown in FIG. 12 are some first features.

Some speckles in a speckle lattice may have a same shape (for example, the speckle lattice includes a plurality of dots). Although the electronic device 100 may distinguish between different speckles based on locations of the speckles in the speckle lattice, it takes a comparatively long time for the electronic device 100 to distinguish between different speckles based on the locations of the speckles in the speckle lattice, and power consumption of the electronic device 100 is wasted. The feature distance used when the electronic device 100 selects the first feature may be less than or equal to a repetition interval of the speckle lattices in the plurality of light spots. In other words, the feature frequency is greater than or equal to the repetition frequency of the speckle lattices in the plurality of light spots. In this way, it can be ensured as far as possible that two adjacent first features selected by the electronic device 100 from the first image information correspond to speckles in different speckle lattices, so that the electronic device 100 can distinguish between the two adjacent first features. This can reduce a possibility of a feature matching error, and improve accuracy of the depth information calculated by the electronic device 100.

S203b. For each first feature, the electronic device 100 calculates a depth of a point at which the first feature is located by using a formula (2) and based on a parallax d between the first camera 102 and the second camera 103 for the first feature, the first length T, and the lens focal length f, to obtain the depth information of the target object.

The formula (2) is $$Z = \frac{f \times T}{d}.$$

Figure 13:
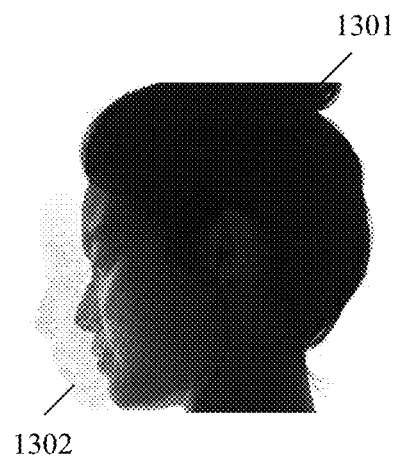
FIG. 13 is a schematic diagram of an example of depth information of a human face according to an embodiment of this application.

For example, it is assumed that the target object is a human face 1301 shown in FIG. 13. The electronic device 100 may calculate depths of a plurality of points shown in FIG. 13, to obtain depth information 1302 of the target object 1301.

An embodiment of this application provides a method for obtaining depth information. An electronic device 100 may emit infrared light with a light spot by using an infrared projector 101. In this way, images of a target object that are collected by a first camera 102 and a second camera 103 may not only include a feature of the target object, but also include a texture feature formed when the infrared light with the light spot is irradiated onto the target object. That is, a quantity of features in the images of the target object that are collected by the first camera 102 and the second camera 103 can be increased. After the quantity of features in the images of the target object that are collected by the first camera 102 and the second camera 103 is increased, the electronic device 100 can more accurately identify a same feature in image information collected by the first camera 102 and image information collected by the second camera 103, and further determine a parallax between the first camera 102 and the second camera 103 for the same feature and calculate a depth of a point at which each feature is located, to obtain depth information of the target object. This can improve accuracy of the depth information of the target object that is calculated by the electronic device 100.

In some embodiments, the electronic device 100 includes the first camera 102 and the second camera 103. The first camera 102 and the second camera 103 may sense visible light. The first camera 102 or the second camera 103 may serve as a primary camera. The electronic device 100 may display, on a display screen of the electronic device 100, image information collected by the primary camera under visible light. Further, the first camera 102 and the second camera 103 may further sense infrared light, to cooperate with the infrared projector 101 to enable the electronic device 100 to calculate the depth information of the target object.

However, because the first camera 102 and the second camera 103 can sense infrared light, the image information of the target object that is collected by the electronic device 100 may be slightly red. In this case, the image information that is collected by the primary camera (the first camera 102 or the second camera 103) and that is displayed on the display screen of the electronic device 100 may be slightly red, thereby affecting visual experience of a user.

To avoid a problem that the image information displayed on the display screen of the electronic device 100 is slightly red, in some other embodiments, the electronic device 100 may not only include the first camera 102 and the second camera 103, but also include a third camera 104. The third camera 104 is an RGB camera (that is, a common RGB camera). The third camera 104 is configured to collect image information under visible light. The third camera 104 may be disposed between the first camera 102 and the second camera 103, or may be disposed at another location.

In this embodiment, the first camera 102 and the second camera 103 not only can sense visible light, but also can sense infrared light, that is, the first camera 102 and the second camera 103 not only may collect image information under infrared light, but also may be configured to collect image information under visible light. However, the image information collected by the first camera 102 and the second camera 103 is only used to calculate the depth information of the target object. The third camera 104 is configured to collect image information under visible light. The image information collected by the third camera 104 is used to be displayed on the display screen of the electronic device 100. This can avoid a problem that the image information displayed on the display screen of the electronic device 100 is slightly red, and can ensure visual experience of a user in photographing an image.

It should be noted that the foregoing embodiments are described by using an example in which the lens focal length of the first camera is the same as that of the second camera. However, in another implementation, the lens focal length of the first camera may be alternatively different from that of the second camera. When the lens focal lengths of the two cameras are different, the foregoing formula for calculating the depth Z is modified for calculating a depth. A specific calculation formula may be a formula in the prior art.

For example, in a scenario such as a face-based unlocking scenario or a face-based payment scenario, the image information collected by the third camera 104 may be displayed on the display screen of the electronic device 100 when a two-dimensional human face image used for facial recognition is entered on the electronic device 100. The image information collected by the first camera 102 and the second camera 103 is used to calculate depth information of a target object when the electronic device 100 performs facial recognition. To be specific, a facial recognition process of the electronic device 100 may include: recognition of two-dimensional human face information and human face depth authentication. The recognition of two-dimensional human face information means that the electronic device 100 determines whether the two-dimensional image of the target object that is collected by the electronic device 100 matches a two-dimensional human face image stored on the electronic device 100. The human face depth authentication means that the electronic device 100 determines whether the depth information of the target object has a depth feature of a real human face. If the depth information of the target object has a depth feature of a real human face, it indicates that the target object is a real human face; or if the depth information of the target object does not have a depth feature of a real human face, it indicates that the target object is not a real human face. For example, the target object may be a photo including a two-dimensional image that matches the two-dimensional human face image pre-stored on the electronic device. If the depth information of the target object does not have a depth feature of a real human face, even if the two-dimensional image of the target object matches the two-dimensional human face image stored on the electronic device 100, facial recognition of the target object still fails. That is, facial recognition performed on the electronic device by using the photo fails. This can prevent information of the electronic device 100 from being leaked or avoid a property loss of a user, and can protect security of the information of the electronic device 100 and improve security performance of the electronic device 100.

In an AR scenario and a 3D modeling scenario, the electronic device 100 may combine the depth information of the target object that is calculated based on the image information collected by the first camera 102 and the second camera 103 with the image information of the target object that is collected by the third camera 104, to construct a real human face model of the target object, so as to improve authenticity of the AR scenario and the 3D modeling scenario.

In a wide aperture scenario, the electronic device 100 may perform the foregoing method to calculate a depth of each point in an image collected by the electronic device 100, and then perform blurring processing on a point with a depth greater than a preset value, to highlight a point with a depth less than the preset value, so as to implement a wide aperture effect.

For example, when the electronic device 100 collects an image including a human face, a depth of each point on the human face is less than a depth of each point on a background (the background is behind the human face and is farther away from the camera). Therefore, in the wide aperture scenario, a human face image may be highlighted, and a background image may be blurred.

For example, in the wide aperture scenario, the first operation may include an operation of enabling a "Camera" application by the user and an operation of selecting a "Wide Aperture" mode in the "Camera" application by the user. If the electronic device 100 receives the first operation, it indicates that the electronic device 100 needs to photograph an image by using the wide aperture scenario (that is, perform the first event). In response to the first event, the electronic device 100 may perform the foregoing method for obtaining depth information to obtain the depth information of the target object, and then implement a wide aperture effect based on the depth information of the target object. The image collected by the third camera 104 is displayed on the display screen of the electronic device 100. The electronic device 100 may perform, based on the obtained depth information, wide aperture processing on both a displayed photographing preview picture and an image that is finally photographed, that is, a close target object may be highlighted in both the preview picture and the photographed image, and another object is blurred.

Figure 14:
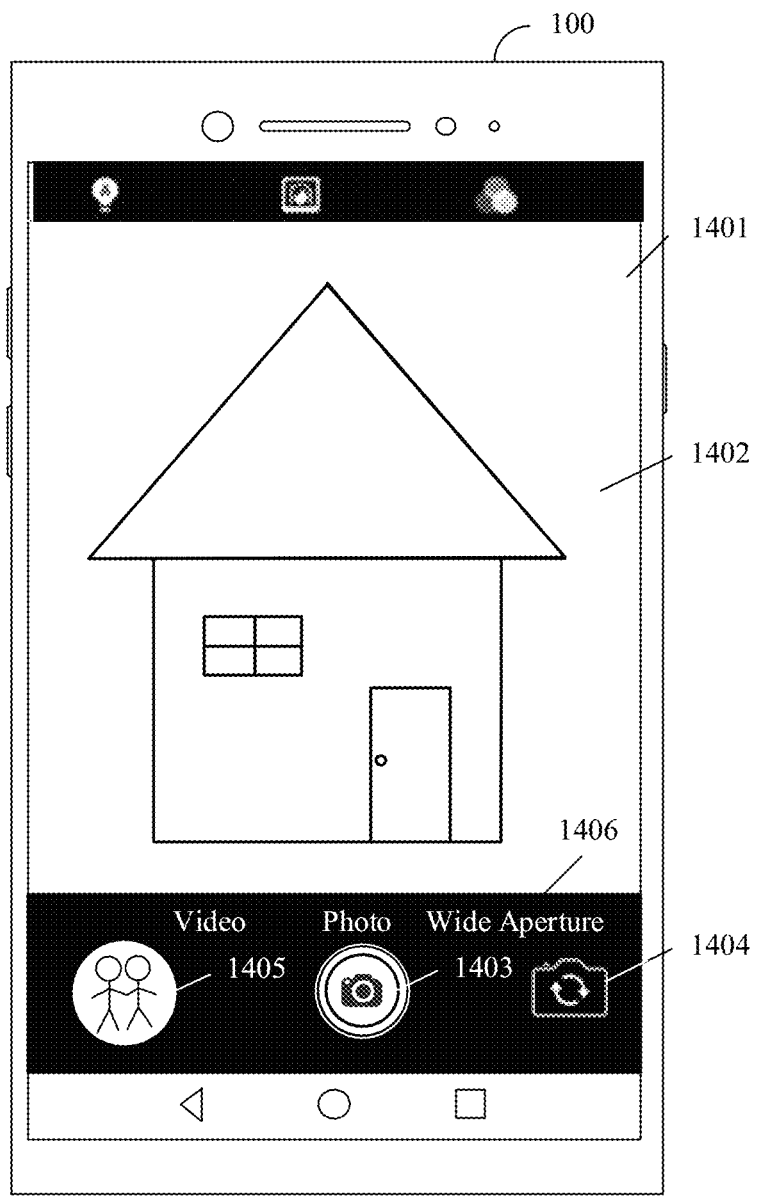
FIG. 14 is a schematic diagram of an example of a graphical user interface according to an embodiment of this application.

For example, the operation of enabling the "Camera" application by the user may be a single-touch operation performed by the user on an icon of the "Camera" application. In response to the operation of enabling the "Camera" application by the user, the electronic device 100 may display a photographing interface 1401 shown in FIG. 14. The photographing interface 1401 includes a viewfinder frame 1402, a camera switching key 1404, a photographing key 1403, and an album key 1405. The viewfinder frame 1402 is configured to display a preview image captured by a rear-facing camera or a front-facing camera of the electronic device 100. The camera switching key 1404 is configured to trigger the electronic device 100 to switch between a front-facing camera and a rear-facing camera for capturing an image. The photographing key 1403 is configured to control the electronic device 100 to save a preview image that is captured by the rear-facing camera or the front-facing camera and that is displayed in the viewfinder frame 1402. The album key 1405 is configured to view an image stored on the electronic device 100. When a default camera of the electronic device 100 is the rear-facing camera, a preview image captured by the rear-facing camera may be displayed in the viewfinder frame 1402, as shown in FIG. 14. The preview image is captured by the third camera 104.

The photographing interface 1401 may further include an option of a photographing mode of the electronic device 100. Photographing modes of the electronic device 100 may include: a rear-facing camera photographing mode, a selfie mode, a video mode, a wide aperture mode, a panoramic mode, and the like. For example, as shown in FIG. 14, the photographing interface 1401 may further include a "Wide Aperture" option 1406, a "Photo" option, a "Video" option, and the like. Certainly, in this embodiment of this application, the photographing modes include but are not limited to the rear-facing camera photographing mode, the selfie mode, the panoramic mode, the wide aperture mode, and the video mode. Other photographing modes are not described in detail herein in this embodiment of this application.

The foregoing operation of selecting the "Wide Aperture" mode in the "Camera" application by the user may be a touch operation (for example, a single-touch operation, a double-touch operation, or a touch and hold operation) performed by the user on the "Wide Aperture" option 1406 shown in FIG. 14. Alternatively, the foregoing operation of selecting the "Wide Aperture" mode in the "Camera" application by the user may be a preset gesture (for example, an L-shaped gesture) entered by the user on the photographing interface 1401 shown in FIG. 14, and the preset gesture is used to trigger the electronic device 100 to photograph an image in the wide aperture mode.

In the wide aperture scenario, the method in this embodiment of this application may further include: In response to the first event, the electronic device 100 collects a two-dimensional image of the target object by using the third camera 104. The electronic device 100 displays, on the display screen, the two-dimensional image (referred to as an RGB image of the target object) collected by the third camera 104. The electronic device 100 identifies a human face image (referred to as an RGB image of a human face) in the two-dimensional image collected by the third camera 104. After the electronic device 100 calculates the depth information of the target object (that is, S203), the method in this embodiment of this application may further include: The electronic device 100 identifies depth information of a human face (referred to as a depth image of the human face) from the depth information of the target object (referred to as a depth image of the target object). The electronic device 100 performs mapping on the RGB image of the target object and the depth image of the target object based on the RGB image of the human face and the depth image of the human face, to find a coordinate region that is in the RGB image of the target object and that corresponds to the depth image of the human face in the depth image, that is, find a coordinate region of a face region in the RGB image, and then blurs a part of the RGB image of the target object other than this part of coordinate region. This can achieve an effect of blurring a background.

It can be understood that, to implement the foregoing functions, the electronic device includes corresponding hardware structures and/or software modules for performing the functions. A person skilled in the art should easily be aware that, in combination with the example units, algorithms, and steps described in the embodiments disclosed in this specification, the embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the electronic device may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in the embodiments of this application, module division is merely an example, and is merely a logical function division. In actual implementation, another division manner may be used.

Figure 15:
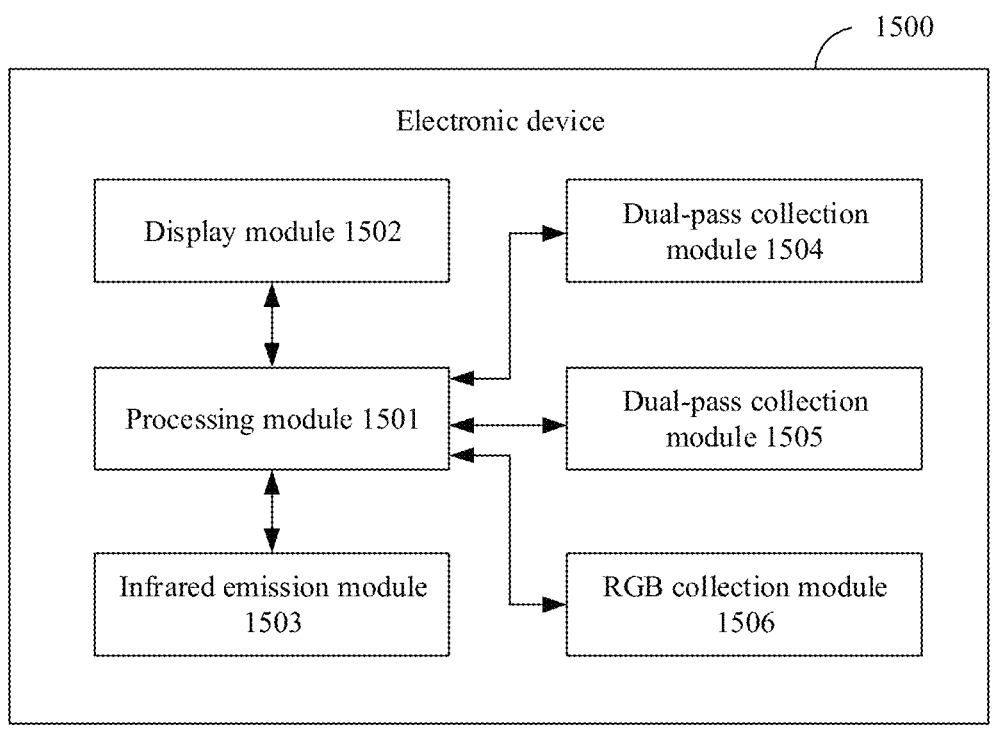
FIG. 15 is a schematic diagram of a structural composition of an electronic device according to an embodiment of this application.

When an integrated unit is used, FIG. 15 is a possible schematic structural diagram of an electronic device 1500 in the foregoing embodiments. The electronic device 1500 may include a processing module 1501, a display module 1502, an infrared emission module 1503, a dual-pass collection module 1504, a dual-pass collection module 1505, and an RGB collection module 1506. Optionally, the electronic device 1500 may further include a communications module, and the communications module includes a Bluetooth module, a Wi-Fi module, and the like.

The processing module 1501 is configured to control and manage an action of the electronic device 1500. The RGB collection module 1506 is configured to collect an image of a target object under visible light. The display module 1502 is configured to display an image generated by the processing module 1501 and the image collected by the RGB collection module 1506. The infrared emission module 1503 is configured to emit infrared light with a light spot. The dual-pass collection module 1504 and the dual-pass collection module 1505 are configured to collect an image of the target object under visible light and an image of the target object under infrared light. The communications module is configured to support the electronic device 1500 in communicating with another device. The processing module 1501 is further configured to calculate depth information of the target object based on the image collected by the dual-pass collection module 1504.

Specifically, the processing module 1501 may be configured to support the electronic device 1500 in performing S201, S203, S203a, and S203b in the foregoing method embodiment, and/or another process used for the technology described in this specification. The display module 1502 may be configured to support the electronic device 1500 in performing the operation of "displaying the image collected by the RGB collection module 1506" in the foregoing method embodiment, and/or another process used for the technology described in this specification. The infrared emission module 1503 may be configured to support the electronic device 1500 in performing the operation of "emitting infrared light with a light spot" in S202 in the foregoing method embodiment, and/or used in another process of the technology described in this specification. The dual-pass collection module 1504 may be configured to support the electronic device 1500 in performing the operation of "collecting first image information" in S202 in the foregoing method embodiment, and/or another process used for the technology described in this specification. The dual-pass collection module 1505 may be configured to support the electronic device 1500 in performing the operation of "collecting second image information" in S202 in the foregoing method embodiment, and/or another process used for the technology described in this specification. The RGB collection module 1506 may be configured to support the electronic device 1500 in collecting image information under visible light, and/or used in another process of the technology described in this specification.

Certainly, unit modules in the electronic device 1500 include but are not limited to the processing module 1501, the display module 1502, the infrared emission module 1503, the dual-pass collection module 1504, the RGB collection module 1506, and the like. For example, the electronic device 1500 may further include a storage module. The storage module is configured to store program code and data of the electronic device 1500.

The processing module 1501 may be a processor or a controller, such as a central processing unit (Central Processing Unit, CPU), a digital signal processor (Digital Signal Processor, DSP), an application-specific integrated circuit (Application-Specific Integrated Circuit, ASIC), a field programmable gate array (Field Programmable Gate Array, FPGA) or another programmable logical device, a transistor logical device, a hardware component, or any combination thereof. The processor may include an application processor and a baseband processor. The processor may implement or execute various example logical blocks, modules, and circuits described with reference to content disclosed in this application. The processor may be a combination of processors implementing a computing function, for example, a combination including one or more microprocessors, or a combination of a DSP and a microprocessor. The storage module may be a memory.

For example, the processing module 1501 is one or more processors (for example, the processor 110 shown in FIG. 1D), and the communications module includes a wireless communications module (for example, the wireless communications module 160 shown in FIG. 1D, where the wireless communications module 160 includes a BT (that is, a Bluetooth module) and a WLAN (for example, a Wi-Fi module)). The wireless communications module may be referred to as a communications interface. The storage module may be a memory (for example, the internal memory 121 shown in FIG. 1D). The display module 1502 may be a display screen (for example, the display screen 194 shown in FIG. 1D). The infrared emission module 1503 may be an infrared projector (for example, the infrared projector 196 shown in FIG. 1D, that is, the infrared projector 101 in the foregoing embodiment). The two dual-pass collection modules 1504 and 1505 may be two dual-pass cameras (for example, the dual-pass camera 193B (that is, the first camera 102 in the foregoing embodiment) and the dual-pass camera 193C (that is, the second camera 103 in the foregoing embodiment) shown in FIG. 1D). The RGB collection module 1506 may be an RGB camera in the 1 to N other cameras 193A shown in FIG. 1D, that is, the third camera 104 in the foregoing embodiment. The two dual-pass collection modules 1504 and the RGB collection module 1506 are disposed on a same side of the electronic device 100, for example, a front side or a rear side. The electronic device 1500 provided in this embodiment of this application may be the electronic device 100 shown in FIG. 1D. The one or more processors, the memory, the infrared projector, the first camera, the second camera, the display screen, the third camera, and the like may be connected, for example, connected by using a bus.

An embodiment of this application further provides a computer storage medium. The computer storage medium stores computer program code. When the processor executes the computer program code, the electronic device 1500 performs related method steps in either the accompanying drawing FIG. 2 or FIG. 9 to implement the method in the foregoing embodiment.

An embodiment of this application further provides a computer program product. When the computer program product runs on a computer, the computer is enabled to perform related method steps in either the accompanying drawing FIG. 2 or FIG. 9 to implement the method in the foregoing embodiment.

The electronic device 1500, the computer storage medium, and the computer program product provided in the embodiments of this application are all configured to perform the corresponding methods provided in the foregoing descriptions. Therefore, for beneficial effects that can be achieved by the electronic device 1500, the computer storage medium, and the computer program product, refer to the beneficial effects of the corresponding methods provided in the foregoing descriptions. Details are not described herein again.

The foregoing descriptions about the implementations allow a person skilled in the art to clearly understand that, for the purpose of convenient and brief description, division of the foregoing function modules is taken as an example for illustration. During actual application, the foregoing functions can be allocated to different function modules and implemented based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes any medium that can store program code, such as a USB flash drive, a removable hard disk, a ROM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for obtaining depth information, comprising:
receiving a first instruction configured to trigger an electronic device to obtain depth information of a target object;
in response to the first instruction:
emitting infrared light using an infrared projector of the electronic device, wherein the infrared light comprises a plurality of light spots arranged in first and second speckle lattice groups, wherein the first speckle lattice group comprises a first speckle lattice and a second speckle lattice adjacent to the first speckle lattice, wherein the second speckle lattice group comprises a third speckle lattice and a fourth speckle lattice adjacent to the third speckle lattice, wherein the first speckle lattice is different than the second speckle lattice, and wherein the first speckle lattice is the same as the third speckle lattice and different than the fourth speckle lattice;
collecting first image information of the target object using a first camera of the electronic device; and
collecting second image information of the target object using a second camera of the electronic device, wherein the first image information and the second image information comprise a feature of the target object and a texture feature formed when the infrared light comprising the plurality of light spots is emitted onto the target object; and
calculating the depth information based on the first image information, the second image information, a first length from the first camera to the second camera, a first lens focal length of the first camera, and a second lens focal length of the second camera.

2. The method of claim 1, wherein the first lens focal length and the second lens focal length are a same lens focal length.

3. The method of claim 2, further comprising:
calculating a plurality of parallaxes between the first camera and the second camera for a plurality of first features in the first image information and the second image information, wherein the first features are same features in the first image information and the second image information; and
calculating, for each first feature of the first features, a depth Z of a point at which the first feature is located using the following formula to obtain the depth information of the target object:

$$Z = \frac{f \times T}{d},$$

wherein f is the lens focal length, wherein d is a parallax between the first camera and the second camera for the first feature, and wherein T is the first length.

4. The method of claim 3, wherein before calculating the parallaxes between the first camera and the second camera, the method further comprises selecting the first features from the first image information and the second image information.

5. The method of claim 1, wherein a first individual speckle in the first speckle lattice has a different shape than a second individual speckle in the first speckle lattice.

6. The method of claim 1, further comprising selecting a plurality of first features from the first image information and the second image information based on a preset feature frequency, wherein a feature frequency of the first features is greater than or equal to a repetition frequency of the speckle lattices in the light spots, wherein the feature frequency is based on a first quantity of same first features from an image with a preset area, and wherein the repetition frequency is based on a second quantity of same speckle lattices that appear in the preset area.

7. The method of claim 1, wherein two sides of each lens of the first camera and the second camera each comprise an antireflection coating, wherein light filters of the first camera and the second camera each comprise a cut-off coating, wherein the antireflection coating increases a transmittance of infrared light, and wherein the cut-off coating filters out light other than infrared light and visible light and increases a transmittance of infrared light.

8. The method of claim 1, wherein a wavelength of the infrared light from the infrared projector is between 890 nanometers and 990 nanometers.

9. The method of claim 1, wherein a wavelength of the infrared light from the infrared projector is 940 nanometers.

10. The method of claim 1, wherein the first length ranges from 20 millimeters to 30 millimeters.

11. An electronic device, comprising:
an infrared projector;
a first camera having a first lens focal length;
a second camera having a second lens focal length, wherein a distance between the first camera and the second camera is a first length;
a processor coupled to the infrared projector, the first camera, and the second camera; and
a memory coupled to the processor and configured to store instructions that, when executed by the processor, cause the electronic device to be configured to:
receive a first instruction, wherein the first instruction is configured to trigger the electronic device to obtain depth information of a target object;
in response to the first instruction,
emit infrared light using the infrared projector, wherein the infrared light comprises a plurality of light spots arranged in first and second speckle lattice groups, wherein the first speckle lattice group comprises a first speckle lattice and a second speckle lattice adjacent to the first speckle lattice, wherein the second speckle lattice group comprises a third speckle lattice and a fourth speckle lattice adjacent to the third speckle lattice, wherein the first speckle lattice is different than the second speckle lattice, and wherein the first speckle lattice is the same as the third speckle lattice and different than the fourth speckle lattice;
collect first image information of the target object using the first camera; and
collect second image information of the target object using the second camera, wherein the first image information and the second image information comprise a feature of the target object and a texture feature formed when the infrared light comprising the plurality of light spots is emitted onto the target object; and
calculate the depth information based on the first image information, the second image information, the first length, the first lens focal length, and the second lens focal length.

12. The electronic device of claim 11, wherein the first lens focal length and the second lens focal length are a same lens focal length.

13. The electronic device of claim 12, wherein the instructions further cause the processor to be configured to:
calculate a plurality of parallaxes between the first camera and the second camera for first features in the first image information and the second image information, wherein the first features are same features in the first image information and the second image information; and
calculate, for each first feature of the first features, a depth Z of a point at which a second feature of the features is located using the following formula:

$$Z = \frac{f \times T}{d},$$

wherein f is the lens focal length, wherein d is a parallax between the first camera and the second camera for the second feature, and wherein T is the first length.

14. The electronic device of claim 13, wherein before the instructions cause the processor to calculate the parallaxes between the first camera and the second camera, the instructions further cause the processor to be configured to select the first features from the first image information and the second image information.

15. The electronic device of claim 11, wherein a first individual speckle in the first speckle lattice has a different shape than a second individual speckle in the first speckle lattice.

16. The electronic device of claim 11, wherein the instructions further cause the processor to be configured to select the first features based on a preset feature frequency, wherein a feature frequency of the first features is greater than or equal to a repetition frequency of the speckle lattices in the light spots, wherein the feature frequency is based on a first quantity of same first features from an image with a preset area, and wherein the repetition frequency is based on a second quantity of same speckle lattices that appear in the preset area.

17. The electronic device of claim 11, wherein two sides of each lens of the first camera and the second camera each comprise an antireflection coating, wherein light filters of the first camera and the second camera each comprise a cut-off coating, wherein the antireflection coating increases a transmittance of infrared light, and wherein the cut-off coating filters out light other than infrared light and visible light and increases a transmittance of infrared light.

18. The electronic device of claim 11, wherein a wavelength of the infrared light from the infrared projector is between 890 nanometers and 990 nanometers.

19. The electronic device of claim 11, wherein the first length ranges from 20 millimeters to 30 millimeters.

20. A non-transitory computer storage medium having computer usable instructions stored thereon for execution by a processor, wherein the instructions cause the processor to:

receive a first instruction to obtain depth information of a target object;

in response to the first instruction:

emit infrared light using an infrared projector of an electronic device, wherein the infrared light comprises a plurality of light spots arranged in first and second speckle lattice groups, wherein the first speckle lattice group comprises a first speckle lattice and a second speckle lattice adjacent to the first speckle lattice, wherein the second speckle lattice group comprises a third speckle lattice and a fourth speckle lattice adjacent to the third speckle lattice, wherein the first speckle lattice is different than the second speckle lattice, and wherein the first speckle lattice is the same as the third speckle lattice and different than the fourth speckle lattice;

collect first image information of the target object using a first camera of the electronic device; and collect second image information of the target object using a second camera of the electronic device, wherein the first image information and the second image information comprise a feature of the target object and a texture feature formed when the infrared light comprising the plurality of light spots is emitted onto the target object; and calculate the depth information based on the first image information, the second image information, a first length between the first camera and the second camera, a first lens focal length of the first camera, and a second lens focal length of the second camera.

21. The non-transitory computer storage medium of claim 20, wherein a first individual speckle in the first speckle lattice has a different shape than a second individual speckle in the first speckle lattice.

22. The non-transitory computer storage medium of claim 20, wherein the instructions further cause the processor to select the first features based on a preset feature frequency, wherein a feature frequency of the first features is greater than or equal to a repetition frequency of the speckle lattices in the light spots, wherein the feature frequency is based on a first quantity of same first features from an image with a preset area, and wherein the repetition frequency is based on a second quantity of same speckle lattices that appear in the preset area.

23. The method of claim 1, wherein the first speckle lattice being different than the second speckle lattice comprises at least one of a quantity of speckles in each of the first and second speckle lattices being different, a shape of a speckle in each of the first and second speckle lattices being different, and a shape of each of the first and second speckle lattices being different.

24. The method of claim 1, wherein the first speckle lattice is projected to a first area, wherein the second speckle lattice is projected to a second area, and wherein the first area is mutually exclusive of the second area.

25. The electronic device of claim 11, wherein the first speckle lattice being different than the second speckle lattice comprises at least one of a quantity of speckles in each of the first and second speckle lattices being different, a shape of a speckle in each of the first and second speckle lattices being different, and a shape of each of the first and second speckle lattices being different.

26. The electronic device of claim 11, wherein the first speckle lattice is projected to a first area, wherein the second speckle lattice is projected to a second area, and wherein the first area is mutually exclusive of the second area.

* * * * *